(12) United States Patent
Asami et al.

(10) Patent No.: US 12,722,258 B2
(45) Date of Patent: Sep. 1, 2026

(54) OIL PULSE TOOL, AND METHOD FOR CONTROLLING OIL PULSE TOOL

(71) Applicant: MAKITA CORPORATION, Anjo (JP)

(72) Inventors: Naoya Asami, Anjo (JP); Koji Takahagi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 19/080,565

(22) Filed: Mar. 14, 2025

(65) Prior Publication Data

US 2025/0296207 A1 Sep. 25, 2025

(30) Foreign Application Priority Data

Mar. 25, 2024 (JP) ................................ 2024-048048

(51) Int. Cl.

| | |
|---|---|
| ***B25F 5/00*** | (2006.01) |
| ***B25B 21/02*** | (2006.01) |
| ***G01K 3/10*** | (2006.01) |
| ***H02P 29/60*** | (2016.01) |

(52) U.S. Cl.
CPC .............. *B25B 21/02* (2013.01); *H02P 29/60* (2016.02)

(58) Field of Classification Search
CPC ................................ B25B 21/02; H02P 29/60
See application file for complete search history.

(56) References Cited

U.S. PATENT DOCUMENTS

| | | | | |
|---|---|---|---|---|
| 5,592,396 | A * | 1/1997 | Tambini | B25B 23/14 702/179 |
| 8,925,645 | B2 * | 1/2015 | Harada | B25B 23/1405 173/9 |
| 9,314,908 | B2 * | 4/2016 | Tanimoto | B25B 21/026 |
| 9,407,195 | B2 * | 8/2016 | Nishii | B25F 5/008 |
| 9,878,435 | B2 * | 1/2018 | Ito | B25F 5/001 |
| 11,213,934 | B2 * | 1/2022 | Bandy | B25B 23/1475 |
| 11,890,726 | B2 * | 2/2024 | Bandy | B25B 23/1453 |
| 12,090,607 | B2 * | 9/2024 | Takahagi | B25B 21/026 |
| 12,111,621 | B2 * | 10/2024 | Abbott | B25B 21/00 |
| 2011/0203822 | A1 | 8/2011 | Harada et al. | |
| 2013/0133911 | A1 | 5/2013 | Ishikawa et al. | |
| 2021/0031342 | A1 | 2/2021 | Takahagi | |
| 2022/0118589 | A1 * | 4/2022 | Takahagi | B25B 21/026 |
| 2025/0276430 | A1 * | 9/2025 | Daily | G01K 3/10 |

FOREIGN PATENT DOCUMENTS

| | | | |
|---|---|---|---|
| JP | 2008-044080 | A | 2/2008 |
| JP | 5382291 | B2 | 1/2014 |
| JP | 5784473 | B2 | 9/2015 |
| JP | 2021-024015 | A | 2/2021 |

* cited by examiner

*Primary Examiner* — Shelley M Self
*Assistant Examiner* — David G Shutty
(74) *Attorney, Agent, or Firm* — Oliff PLC

(57) ABSTRACT

One aspect of the present disclosure provides an oil pulse tool including an output shaft, an electric motor, an oil unit, and a controller. The oil unit is configured (i) to contain oil therein, (ii) to be rotated by an output of the electric motor, and (iii) to apply an impact to the output shaft using the oil. The controller is configured to perform a protection operation to reduce the output of the electric motor, in response to the impact having been applied to the output shaft such that an actual temperature of the oil unit can exceed a temperature threshold.

20 Claims, 13 Drawing Sheets

81
78
88
89
85
22
80
80A
60
66
86
72(23)
ROTATION
67
64
64
62(51)
74
66B
66A
UP
RIGHT
LEFT
DOWN 81
78
88
64
89
85
22
80
80A
60
66
86
72(23)
ROTATION
67
62(51)
74
66A
66B
64
UP
RIGHT
LEFT
DOWN 81
78
64
88
89
85
22
80
80A
60
66
86
72(23)
ROTATION
67
74
62(51)
66B
66A
64
UP
RIGHT
LEFT
DOWN

OIL PULSE TOOL, AND METHOD FOR CONTROLLING OIL PULSE TOOL

CROSS-REFERENCE TO RELATED APPLICATIONS

This application claims the benefit of Japanese Patent Application No. 2024-048048 filed on Mar. 25, 2024, with the Japan Patent Office, the entire disclosure of which is incorporated herein by reference.

BACKGROUND

The present disclosure relates to an oil pulse tool.

The Japanese Patent No. 5382291 discloses an oil pulse tool that is equipped with an oil pulse unit. The oil pulse unit includes a liner and a liner plate that are rotated by a motor. The liner and the liner plate form a closed space filled with oil. In the closed space, a main shaft is rotatably inserted, and a rotational torque of the liner is transmitted to the main shaft via the oil, causing the main shaft to rotate. When a tightening bolt seats, the main shaft stops, and a high-pressure chamber and a low-pressure chamber of oil are formed in the liner. The pressure difference between the high-pressure chamber and the low-pressure chamber generates a strong instantaneous rotational force in the main shaft.

SUMMARY

In the above-mentioned oil pulse tool, every time a strong instantaneous rotational force is generated in the main shaft, the main shaft generates heat due to friction with the oil, etc. This heat causes the oil in the oil pulse unit to expand. The expansion of the oil may cause irreversible malfunctions, such as oil leaking from the oil pulse unit.

It is difficult to directly measure the temperature of the oil inside the rotating oil pulse unit. Therefore, a user of the oil pulse tool should refrain from performing work that applies a large load on the main shaft or should perform such work slowly to avoid malfunctions in the oil pulse unit caused by the increase in the oil temperature. As a result, work efficiency may decrease.

It is desirable that one aspect of the present disclosure can reduce the occurrence of malfunctions caused by the increase in the oil temperature without measuring the oil temperature in the oil pulse tool.

One aspect of the present disclosure provides an oil pulse tool including an output shaft, an electric motor, an oil unit, and a controller.

The oil unit is configured (i) to contain oil therein, (ii) to be rotated by an output of the electric motor, and (iii) to apply an impact to the output shaft using the oil.

The controller is configured to perform a protection operation to reduce the output of the electric motor, in response to the impact having been applied to the output shaft such that an actual temperature of the oil unit can exceed a temperature threshold. The temperature threshold is preset.

The oil pulse tool configured as mentioned above can reduce the occurrence of malfunctions caused by the increase in an actual temperature of the oil without measuring the actual temperature of the oil unit, thus the actual temperature of the oil.

Another aspect of the present disclosure provides a method for controlling an oil pulse tool, including:

rotating an oil unit of the oil pulse tool by an output of an electric motor;

applying an impact to an output shaft of the oil pulse tool using oil in the oil unit; and performing a protection operation to reduce the output of the electric motor, in response to the impact having been applied to the output shaft such that an actual temperature of the oil unit can exceed a temperature threshold, the temperature threshold being preset.

According to such a method, it is possible to reduce the occurrence of malfunctions in the oil pulse tool due to the increase in the actual temperature of the oil without measuring the actual temperature of the oil.

BRIEF DESCRIPTION OF THE DRAWINGS

Some example embodiments of the present disclosure will be described hereinafter by way of example with reference to the accompanying drawings, in which.

DETAILED DESCRIPTION OF EXEMPLARY EMBODIMENTS

1. Overview of Embodiments

Figure 1:
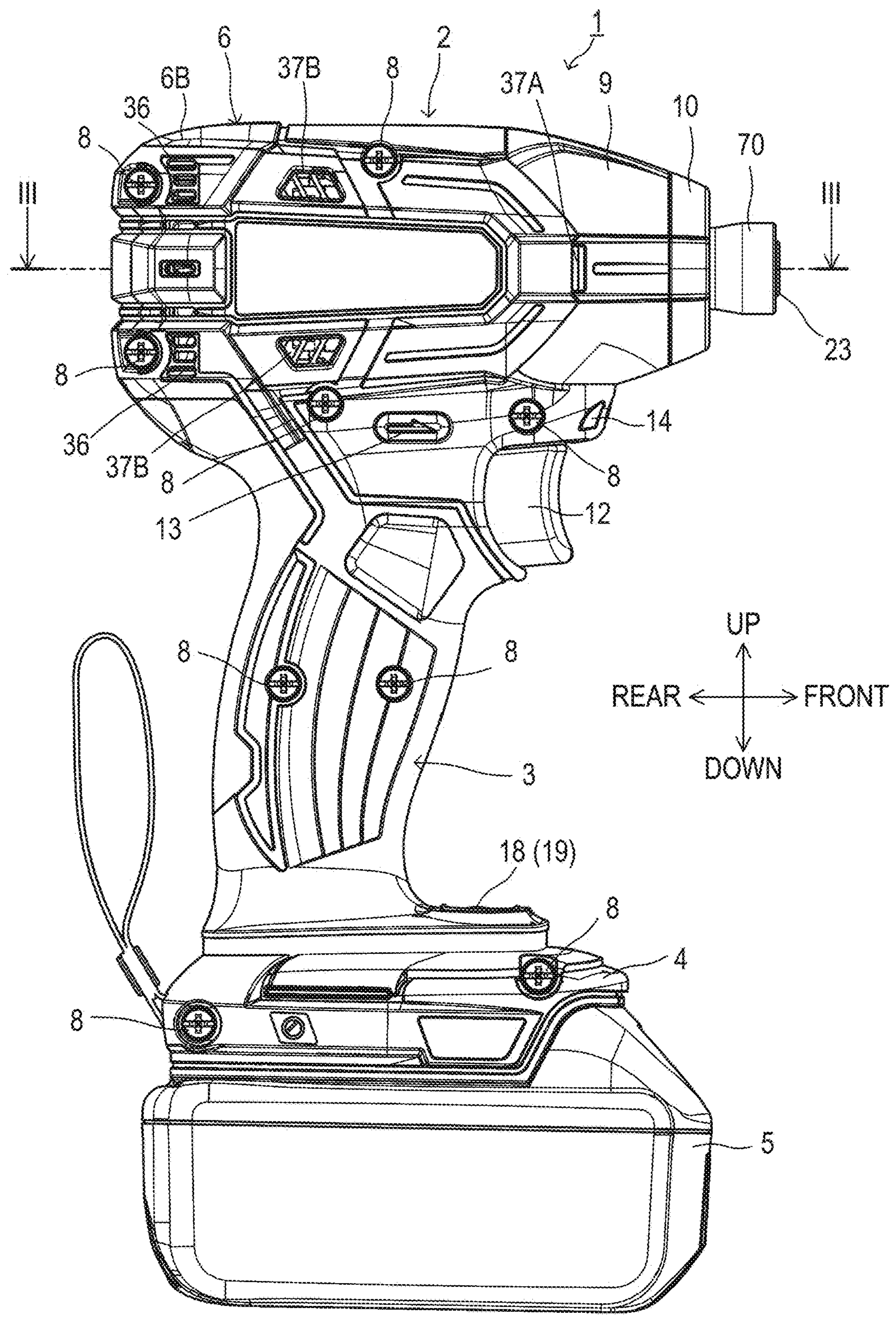
FIG. 1 is a side view of an oil pulse tool according to a first embodiment.

In this disclosure, terms such as “first” and “second” are only intended to distinguish elements from one another and are not intended to limit the order or number of elements. Therefore, a first element may be referred to as a second element, and likewise, the second element may be referred to as the first element. In addition, the first element may be provided without the second element, and likewise, the second element may be provided without the first element.

One embodiment may provide an oil pulse tool (or a rotary impact tool) including at least any one of:

Feature 1: an output shaft;

Feature 2: an electric motor;

Feature 3: an oil unit configured (i) to contain oil therein, (ii) to be rotated by an output of the electric motor, and (iii) to apply an impact to the output shaft using the oil; and Feature 4: a controller configured to perform a protection operation to reduce the output of the electric motor, in response to the impact having been applied to the output shaft such that an actual temperature of the oil unit can exceed a temperature threshold; and Feature 5: the temperature threshold is preset.

The oil pulse tool including at least Features 1 through 5 can reduce the occurrence of malfunctions caused by the increase in an actual temperature of the oil without measuring the actual temperature of the oil unit, thus the actual temperature of the oil.

As a result, a user of the oil pulse tool is not required to refrain from performing heavy-load work using the oil pulse tool or to perform such work slowly to avoid malfunctions in the oil pulse tool. Therefore, work efficiency using the oil pulse tool can be increased.

Examples of the oil pulse tool include an oil pulse driver and an oil pulse wrench. Examples of the oil pulse driver include an oil pulse impact driver and an oil pulse screwdriver.

Examples of the electric motor include a DC motor, an AC motor, a universal motor, and a stepper motor. Examples of the DC motor include a brushless DC motor and a brushed DC motor.

One embodiment may include, in addition to or in place of at least any one of Features 1 through 5, at least any one of:

Feature 6: the controller includes a motor drive circuit configured to drive the electric motor;

Feature 7: the controller includes a motor control circuit configured (or programmed) (i) to receive a command and (ii) to control the electric motor via the motor drive circuit such that the electric motor is driven in accordance with the command;

Feature 8: the controller includes an impact measurement circuit configured (or programmed) to measure the impact generated in the oil unit;

Feature 9: the controller includes a temperature estimation circuit configured (or programmed) to calculate an estimated temperature value based on a measurement result obtained by the impact measurement circuit;

Feature 10: the estimated temperature value corresponds to an estimated temperature of the oil unit; and Feature 11: the controller includes a protection operation circuit configured (or programmed) to perform the protection operation in response to the estimated temperature value having exceeded a first protection threshold; and Feature 12: the first protection threshold corresponds to the temperature threshold.

The oil pulse tool including at least Features 1 through 12 can estimate the actual temperature of the oil unit by measuring the impact generated in the oil unit.

One embodiment may include, in addition to or in place of at least any one of Features 1 through 12, at least any one of:

Feature 13: the impact measurement circuit is configured (or programmed) to measure a series of counts of impacts;

Feature 14: each of the series of counts of impacts corresponds to a total number of impacts applied to the output shaft per specified time; and Feature 15: the temperature estimation circuit is configured (or programmed) to calculate an accumulated value of the series of counts of impacts measured by the impact measurement circuit as the estimated temperature value.

The oil pulse tool including at least Features 1 through 15 can estimate the actual temperature of the oil unit based on the series of counts of impacts.

One embodiment may include, in addition to or in place of at least any one of Features 1 through 15, at least any one of:

Feature 16: the temperature estimation circuit is configured (or programmed) to reduce the accumulated value, in response to any count of impacts among the series of counts of impacts measured by the impact measurement circuit being less than or equal to a lower limit count; and Feature 17: the lower limit count is preset.

In the oil pulse tool including at least Features 1 through 17, it is possible to estimate the actual temperature of the oil unit more accurately in consideration of heat dissipation in the oil unit while no impact is applied to the output shaft or a small number of impacts are applied to the output shaft.

One embodiment may include, in addition to or in place of at least any one of Features 1 through 17, at least any one of:

Feature 18: the temperature estimation circuit includes a first series of data buffers configured to store the series of counts of impacts;

Feature 19: the temperature estimation circuit is configured (or programmed) to sequentially store the series of counts of impacts in the first series of data buffers; and Feature 20: the estimated temperature value corresponds to a sum of the series of counts of impacts stored in the first series of data buffers.

In the oil pulse tool including at least Features 1 through 20, the sum corresponds to an average count of impacts generated within a time period that is obtained by multiplying the number of the first series of data buffers by the specified time, and this serves as a frequency of impacts. Thus, the actual temperature of the oil unit can be estimated according to the frequency of impacts, making it possible to improve the estimation accuracy.

One embodiment may include, in addition to or in place of at least any one of Features 1 through 20, Feature 21: the protection operation circuit is configured (or programmed) to halt to perform the protection operation in response to (i) the sum of the series of counts of impacts stored in the first series of data buffers having exceeded the first protection threshold and (ii) a newest count of impacts among the series of counts of impacts being less than or equal to the lower limit.

The oil pulse tool including at least Features 1 through 15, and 18 through 21 can inhibit the oil pulse tool from performing the protection operation under the situation where it is unlikely, due to a heat dissipation, that the actual temperature of the oil unit has risen.

One embodiment may include, in addition to or in place of at least any one of Features 1 through 21, at least any one of:

Feature 22: the temperature estimation circuit includes a second series of data buffers distinct from the first series of data buffers;

Feature 23: a total number of the second series of data buffers is different from a total number of the first series of data buffers;

Feature 24: the temperature estimation circuit is configured (or programmed) to store, in the first series of data buffers, the series of counts of impacts measured while a first load is applied to the output shaft;

Feature 25: the temperature estimation circuit is configured (or programmed) to store, in the second series of data buffers, the series of counts of impacts measured while a second load is applied to the output shaft;

Feature 26: the first load is different from the second load;

Feature 27: the protection operation circuit is configured (or programmed) to perform the protection operation in response to (i) the sum of the series of counts of impacts stored in the first series of data buffers having exceeded the first protection threshold or (ii) a sum of the series of counts of impacts stored in the second series of data buffers having exceeded a second protection threshold; and Feature 28: the second protection threshold is (i) preset and (ii) distinct from the first protection threshold.

According to the oil pulse tool including at least Features 1 through 15, 18 through 20, and 22 through 28, it is possible to inhibit the malfunctions from occurring in the oil pulse tool not only when the first load is applied to the output shaft but also when the second load is applied to the output shaft.

One embodiment may include, in addition to or in place of at least any one of Features 1 through 28, Feature 29: the temperature estimation circuit is configured (or programmed) to calculate a weighted average of each of the series of counts of impacts as the estimated temperature value.

The oil pulse tool including at least Features 1 through 14, and 29 can estimate the actual temperature of the oil unit without using the first series of data buffers and the second series of data buffers.

One embodiment may include, in addition to or in place of at least any one of Features 1 through 29, Feature 30: the temperature estimation circuit is configured (or programmed) to vary a gain for calculating the weighted average depending on whether each of the series of counts of impacts is greater than or equal to a predetermined count of impacts.

The oil pulse tool including at least Features 1 through 14, 29, and 30 can estimate the actual temperature of the oil unit more accurately depending on the temperature increase characteristic of the oil unit in response to a count of impacts.

One embodiment may include, in addition to or in place of at least any one of Features 1 through 30, at least any one of:

Feature 31: the impact measurement circuit is configured (or programmed) to measure a series of motor current values;

Feature 32: each of the series of motor current values corresponds to a magnitude of a motor current flown through the electric motor per specified time; and Feature 33: the temperature estimation circuit is configured (or programmed) to calculate an accumulated value of the series of motor current values measured by the impact measurement circuit as the estimated temperature value.

The oil pulse tool including at least Features 1 through 12, and 31 through 33 can estimate the actual temperature of the oil unit based on the motor current value.

When an impact is generated, a load is applied from the output shaft to the electric motor, the motor current increases. Therefore, the actual temperature of the oil unit can be estimated based on the magnitude of the motor current and the occurrence of the malfunctions in the oil pulse tool can be inhibited.

One embodiment may include, in addition to or in place of at least any one of Features 1 through 33, at least any one of:

Feature 34: the temperature estimation circuit is configured (or programmed) to reduce the accumulated value in response to any one of the series of motor current values measured by the impact measurement circuit being less than or equal to a lower limit current value; and Feature 35: the lower limit current value is preset.

The oil pulse tool including at least Features 1 through 12, and 31 through 35 can estimate the actual temperature of the oil unit more accurately based on the magnitude of the motor current.

When the electric motor is operating with no load, the motor current decreases. In this state, no impact occurs in the oil unit, and thus, the actual temperature of the oil unit does not rise. In addition, the oil unit may be cooled down due to airflow generated by the rotation of the electric motor, lowering the actual temperature of the oil unit. Therefore, the oil pulse tool including at least Features 1 through 12, and 31 through 35 can estimate the actual temperature of the oil unit more accurately.

One embodiment may include, in addition to or in place of at least any one of Features 1 through 35, Feature 36: the protection operation circuit is configured (or programmed) to prohibit the motor control circuit from driving the electric motor in the protection operation.

The oil pulse tool including at least Features 1 through 12, and 36 can inhibit the malfunctions from occurring by prohibiting the driving of the electric motor.

One embodiment may include, in addition to or in place of at least any one of Features 1 through 36, Feature 37: the protection operation circuit is configured (or programmed) to notify a user of the oil pulse tool that the protection operation is being performed, in response to the driving of the electric motor being prohibited.

According to the oil pulse tool including at least Features 1 through 12, 36, and 37, the user can recognize the reason why the electric motor does not operate. Therefore, it is possible to inhibit the user from feeling unharmonious with the operation of the oil pulse tool.

One embodiment may include, in addition to or in place of at least any one of Features 1 through 37, Feature 38: the protection operation circuit is configured (or programmed) to notify a user of the oil pulse tool that the actual temperature of the oil unit has risen in the protection operation.

The oil pulse tool including at least Features 1 through 12, and 38 can urge the user to refrain from using the oil pulse tool when it is likely that the actual temperature of the oil unit has risen. As a result, it is possible to inhibit the malfunctions from occurring in the oil pulse tool.

One embodiment may include, in addition to or in place of at least any one of Features 1 through 38, at least any one of:

Feature 39: the protection operation circuit is configured (or programmed) to disengage the protection operation in response to a standby time having elapsed after an initiation of the protection operation; and Feature 40: the standby time is preset.

According to the oil pulse tool including at least Features 1 through 12, 39, and 40, the user can promptly resume work after the standby time has elapsed.

One embodiment may include, in addition to or in place of at least any one of Features 1 through 40, Feature 41: the protection operation circuit is configured (or programmed) to vary the first protection threshold according to an ambient temperature of the oil pulse tool.

In the oil pulse tool including at least Features 1 through 12, and 41, the first protection threshold may be varied such that (i) the first protection threshold is high in an environment where the ambient temperature is low and the actual temperature of the oil unit is not likely to increase and (ii) the first protection threshold is low in an environment where the ambient temperature is high and the actual temperature of the oil unit is likely to increase. In this case, it is possible to more appropriately inhibit the malfunctions from occurring in the oil pulse tool depending on the ambient temperature.

One embodiment may include, in addition to or in place of at least any one of Features 1 through 41, Feature 42: the protection operation circuit is configured (or programmed) to vary the first protection threshold according to the ambient temperature at a startup of the oil pulse tool.

In the oil pulse tool including at least Features 1 through 12, 41, and 42, even if the actual temperature of the oil unit rises by the use of the oil pulse tool, the first protection threshold corresponds to the ambient temperature, in other words, the environmental temperature, at the startup of the oil pulse tool. Therefore, it is possible to more appropriately inhibit the malfunctions from occurring in the oil pulse tool depending on the environmental temperature.

One embodiment may include, in addition to or in place of at least any one of Features 1 through 42, Feature 43: a microcomputer programmed to operate as the motor control circuit, the impact measurement circuit, the temperature estimation circuit, and/or the protection operation circuit.

Additionally or alternatively, the motor control circuit, the impact measurement circuit, the temperature estimation circuit and/or the protection operation circuit may be a logic circuit (or a wired logic connection) that includes two or more electronic components, a graphics processing unit (GPU), an application-specific integrated circuit (ASIC), an application-specific standard product (ASSP) and/or a programmable logic device (PLD), such as a field-programmable gate array (FPGA).

One embodiment may include, in addition to or in place of at least any one of Features 1 through 43, at least any one of:

Feature 44: the oil unit includes a case configured (i) to contain the oil therein and (ii) to be rotated by the output of the electric motor, with the output shaft rotatably inserted therethrough; and Feature 45: the oil unit includes an impact mechanism configured to apply pressure to the oil so as to apply the impact to the output shaft in response to a predetermined phase difference having occurred between a rotation of the output shaft and a rotation of the case.

One embodiment may provide a method including at least any one of:

Feature 46: rotating an oil unit of the oil pulse tool by an output of an electric motor;

Feature 47: applying an impact to an output shaft of the oil pulse tool using oil in the oil unit;

Feature 48: performing a protection operation to reduce the output of the electric motor, in response to the impact having been applied to the output shaft such that an actual temperature of the oil unit can exceed a temperature threshold; and Feature 49: the temperature threshold is preset.

According to the method including at least Features 46 through 49, it is possible to reduce the occurrence of malfunctions in the oil pulse tool due to the increase in the actual temperature of the oil without measuring the actual temperature of the oil.

In one embodiment, Features 1 through 49 may be combined in any combination.

In one embodiment, any of Features 1 through 49 may be excluded.

2. Specific Example Embodiments

The following provides some specific example embodiments.

2-1. First Embodiment

The first embodiment illustrates an oil pulse tool 1 described below. FIGS. 1 through 3, 4A, 4B, and 5A through 5C indicate directions of "up", "down", "front", "rear", "left", and "right". However, these directions are provided to facilitate a better understanding of the structure of the oil pulse tool 1 and are not intended to limit its orientation. The oil pulse tool 1 can be arranged in any orientation.

2-1-1. Mechanical Structure of Oil Pulse Tool

As shown in FIG. 1, the oil pulse tool 1 is an oil pulse driver, more specifically, an oil pulse impact driver. In another embodiment, the oil pulse tool 1 may be any other type of oil pulse tool, such as an oil pulse screwdriver or an oil pulse wrench.

The oil pulse tool 1 includes a main body 2 and a grip 3. The main body 2 extends from the rear end of the oil pulse tool 1 towards the front. The grip 3 extends downward from the main body 2. The grip 3 includes a trigger 12 at its upper front. The trigger 12 protrudes forward. The grip 3 includes a rotational direction switch 13 at the upper rear of the trigger 12. The grip 3 includes a light 14 at the front upper part of the trigger 12. The light 14 is configured to illuminate an area in front of the main body 2. The grip 3 includes a battery port 4 at its lower end. The battery port 4 is configured to allow a battery pack 5 to be removably attached to the battery port 4. The battery port 4 includes a switch panel 18 on its upper surface. The switch panel 18 includes one or more manual switches not shown, including a switch for turning the light 14 on or off. The switch panel 18 also includes an indicator 19. The indicator 19 includes one or more light emitting diodes (LEDs). In another embodiment, the indicator 19 may include a liquid crystal display (LCD) in addition to or instead of the one or more LEDs.

Figure 2:
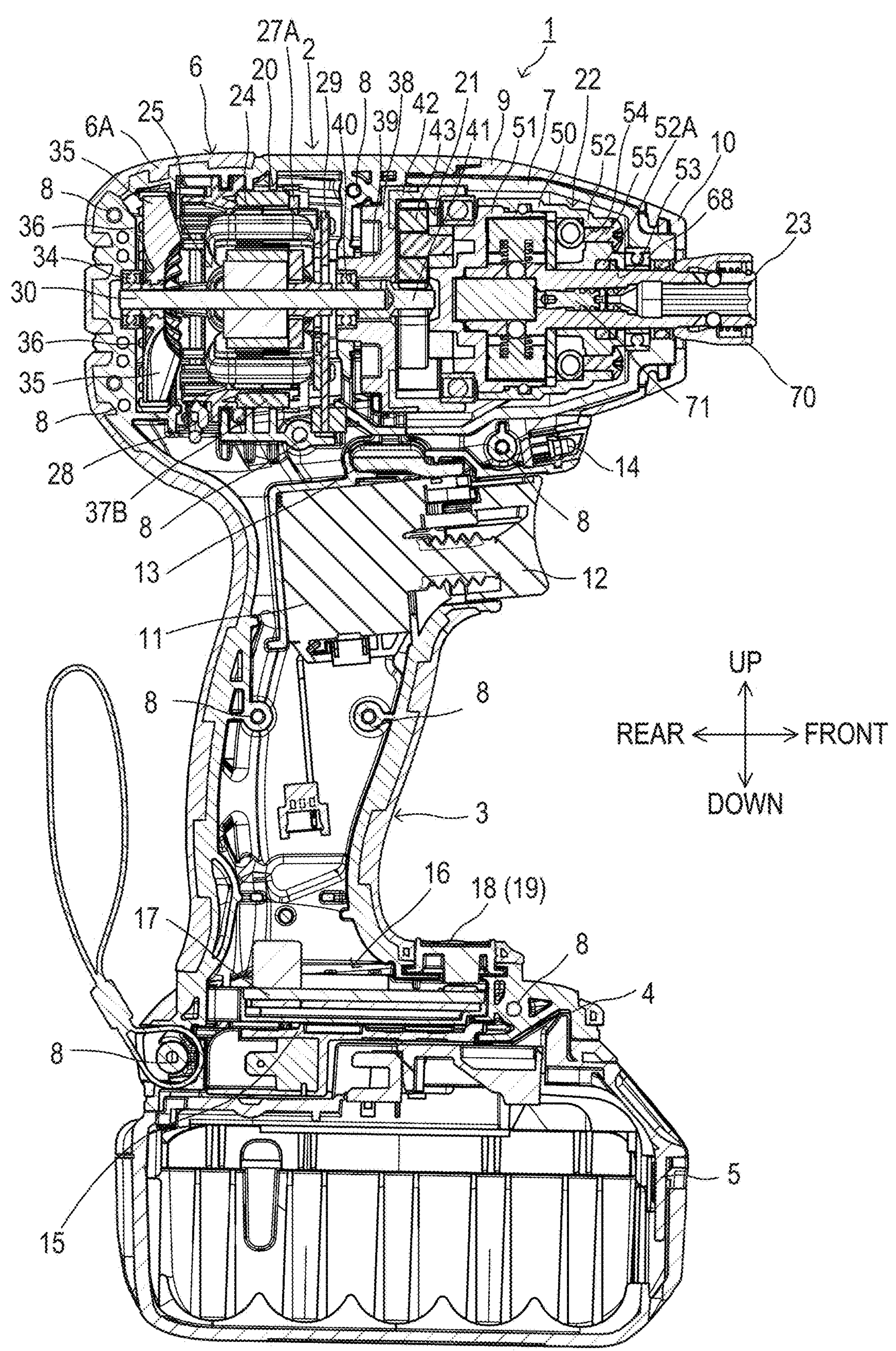
FIG. 2 is a central longitudinal cross-sectional view of the oil pulse tool.
Figure 3:
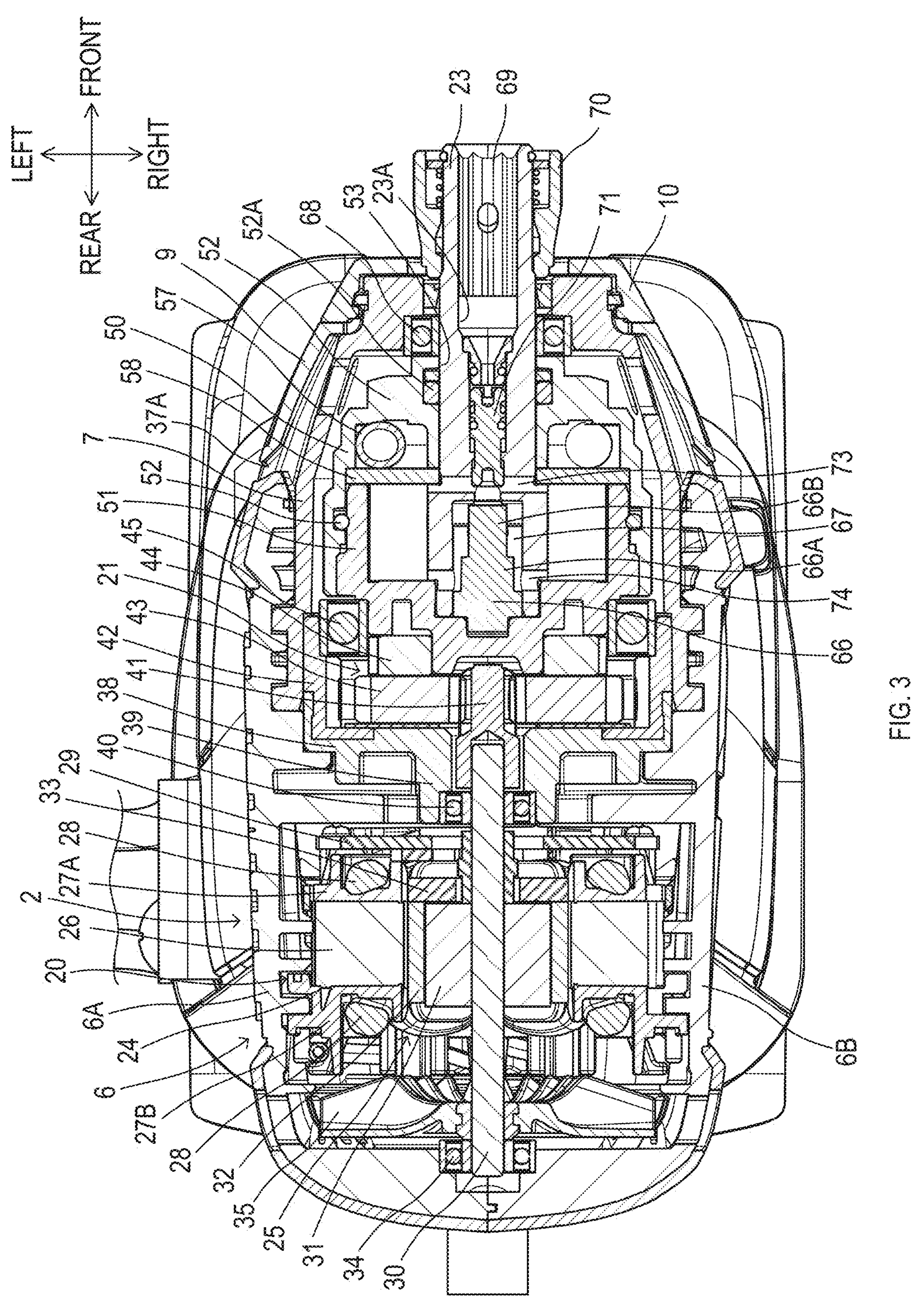
FIG. 3 is an enlarged cross-sectional view along a line III-III in FIG. 1.

As shown in FIGS. 2 and 3, the oil pulse tool 1 includes a main body housing 6 and a unit case 7. The main body housing 6 is integrally formed with the rear portion of the main body 2, the grip 3, and the battery port 4. The unit case 7 is assembled in front of the main body housing 6 to form a front portion of the main body 2. The unit case 7 has a tapered cylindrical shape, but its shape is not limited thereto.

The main body housing 6 includes a left housing 6A and a right housing 6B. The left housing 6A and the right housing 6B are assembled with two or more screws 8. The oil pulse tool 1 is provided with a case cover 9 on the outside of the unit case 7. The case cover 9 is made of resin. The case cover 9 includes a bumper 10 on its front end. The bumper 10 is made of rubber.

The grip 3 includes, inside its upper part, a trigger switch 11 configured to be manually operated via the trigger 12.

The battery port 4 includes a terminal block 15 therein. The terminal block 15 is configured to be electrically coupled to the battery pack 5 attached to the battery port 4. The battery port 4 also includes a controller 16 therein. The controller 16 is arranged above the terminal block 15 and parallel to the terminal block 15. The controller 16 includes a first circuit board 17.

The main body 2 includes an electric motor 20, a reduction drive 21, and an oil unit 22 therein, in this order from the rear side. The oil unit 22 includes an output shaft 23 that is rotatably inserted into the oil unit 22. The output shaft 23 protrudes forward from the oil unit 22. The output shaft 23 includes a front end that is configured such that a tip tool such as a driver bit is removably attached thereto.

The electric motor 20 is an inner-rotor type three-phase brushless DC motor. In another embodiment, the electric motor 20 may be an outer-rotor type brushless DC motor. In yet another embodiment, the electric motor 20 may be a single-phase brushless DC motor, a two-phase brushless DC motor, or a four or more-phase brushless DC motor. In still yet another embodiment, the electric motor 20 may be a brushed DC motor, an AC motor, a universal motor, or a stepper motor.

The electric motor 20 includes a cylindrical stator 24 and a rotor 25 inside the stator 24.

The stator 24 includes a cylindrical stator core 26. The stator core 26 includes two or more laminated steel plates. The stator 24 also includes a front insulator 27A and a rear insulator 27B that are respectively fixed to the front and rear end surfaces of the stator core 26 in an axial direction.

The stator 24 also includes two or more coils 28. The two or more coils 28 are wound around the stator core 26 via the front insulator 27A and the rear insulator 27B. The coils 28 are delta-coupled by being electrically coupled to not-shown fusing terminals held by the front insulator 27A or the rear insulator 27B. In another embodiment, the coils 28 may be star-coupled (or Y-coupled).

The front insulator 27A includes a second circuit board 29 attached thereto. The second circuit board 29 includes a rotational position detector 29A not shown in FIGS. 2 and 3 but shown in FIG. 6.

The rotor 25 includes a rotary shaft 30 and a rotor core 31. The rotary shaft 30 is provided at the center of the rotor core 31. The rotor core 31 is a cylindrical component including two or more laminated steel plates. The rotor 25 also includes two or more first permanent magnets 32. These first permanent magnets 32 are arranged on the circumferential wall of the rotor core 31 with their polarities (i.e., their n-poles and s-poles) alternating in the circumferential direction of the rotor core 31 such that the rotor 25 rotates with the magnetic fluxes from the coils 28.

In addition, the rotor core 31 includes two or more second permanent magnets 33 in front of the two or more first permanent magnets 32. These second permanent magnets 33 are arranged on the front end of the rotor core 31 with their polarities (i.e., their n-poles and s-poles) alternating in the circumferential direction of the rotor core 31.

The rotational position detector 29A includes two or more Hall effect devices. The rotational position detector 29A is configured (i) to detect, by the two or more Hall effect devices, the variations of the magnetic fluxes from the two or more second permanent magnets 33 due to the rotation of the rotor 25 and (ii) to output two or more rotational position detection signals that correspond to the rotational position of the rotor 25.

The rotary shaft 30 includes a rear end held by a bearing 34. The bearing 34 is held on the rear inner surface of the main body housing 6. The rotary shaft 30 includes a fan 35 attached thereto in front of the bearing 34. On the left and right sides of the main body 2, two or more exhaust vents 36 are provided so as to be positioned radially outward from the fan 35.

On the left and right sides of the main body 2, front intake ports 37A are provided in front of the exhaust ports 36. Specifically, the front intake ports 37A are provided on the left and right rear ends of the case cover 9. In addition, two or more rear intake ports 37B are provided behind the front intake ports 37A. Specifically, the rear intake ports 37B are provided in positions radially outward from the front of the electric motor 20.

In the main body housing 6, a gear case 38 is held in front of the electric motor 20. The gear case 38 is disc-shaped and includes a bearing holder 39. The bearing holder 39 supports the front end of the rotary shaft 30 via a bearing 40. The rotary shaft 30 includes a pinion 41 attached to the front end thereof. This pinion 41 protrudes forward through the gear case 38.

The reduction drive 21 includes an internal gear 42, two or more planetary gears 43, and a carrier 44. The internal gear 42 is fixed to the front of the gear case 38. The two or more planetary gears 43 are engaged with the inner side of the internal gear 42. The carrier 44 supports the planetary gears 43.

The front end of the internal gear 42 is inserted into the rear end of the unit case 7. The front end of the internal gear 42 supports a rear case 51 of the oil unit 22 via a bearing 45 held inside. The two or more planetary gears 43 are (i) arranged around the pinion 41 and (ii) engaged with the pinion 41. The carrier 44 is coupled with the rear case 51 of the oil unit 22.

2-1-1-1. Details of Oil Unit

Figure 4A:
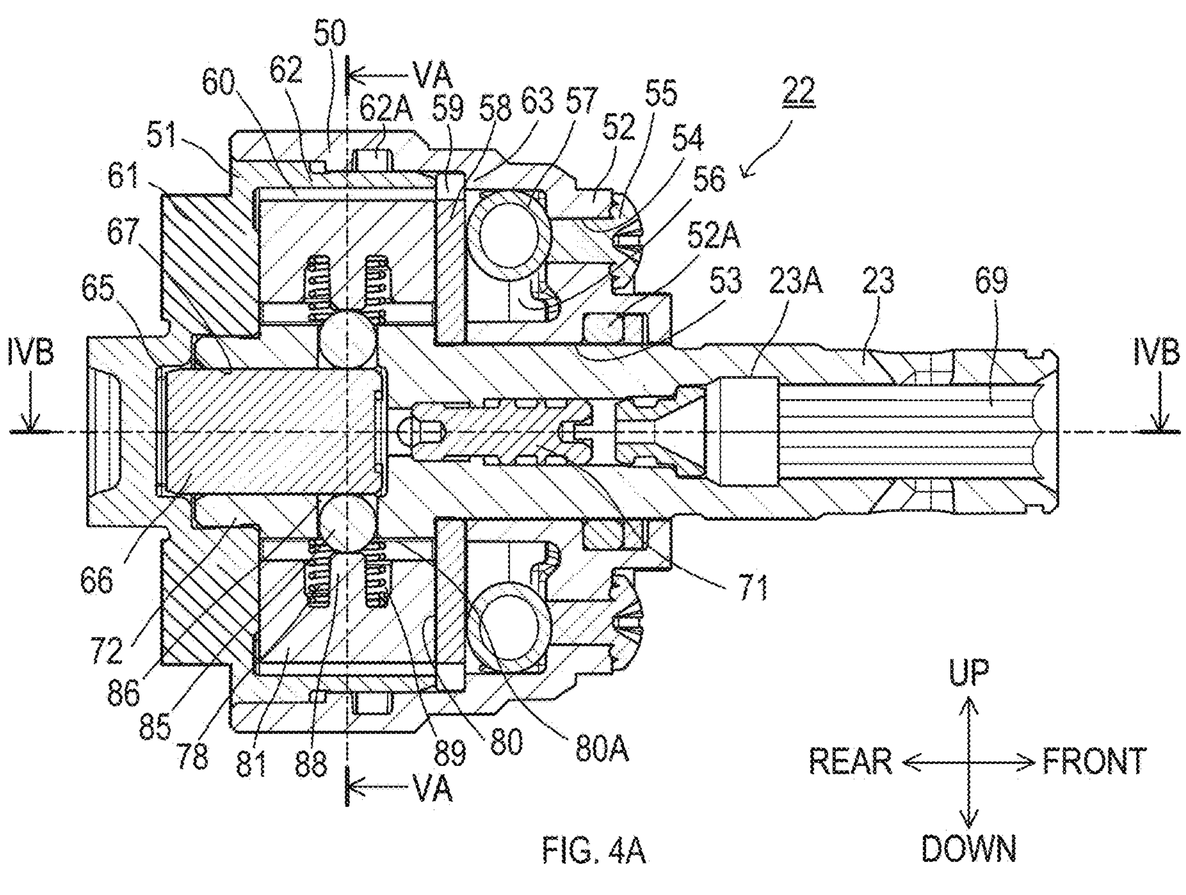
FIG. 4A is a central vertical cross-sectional view of the oil unit shown in FIG. 2.
Figure 4B:
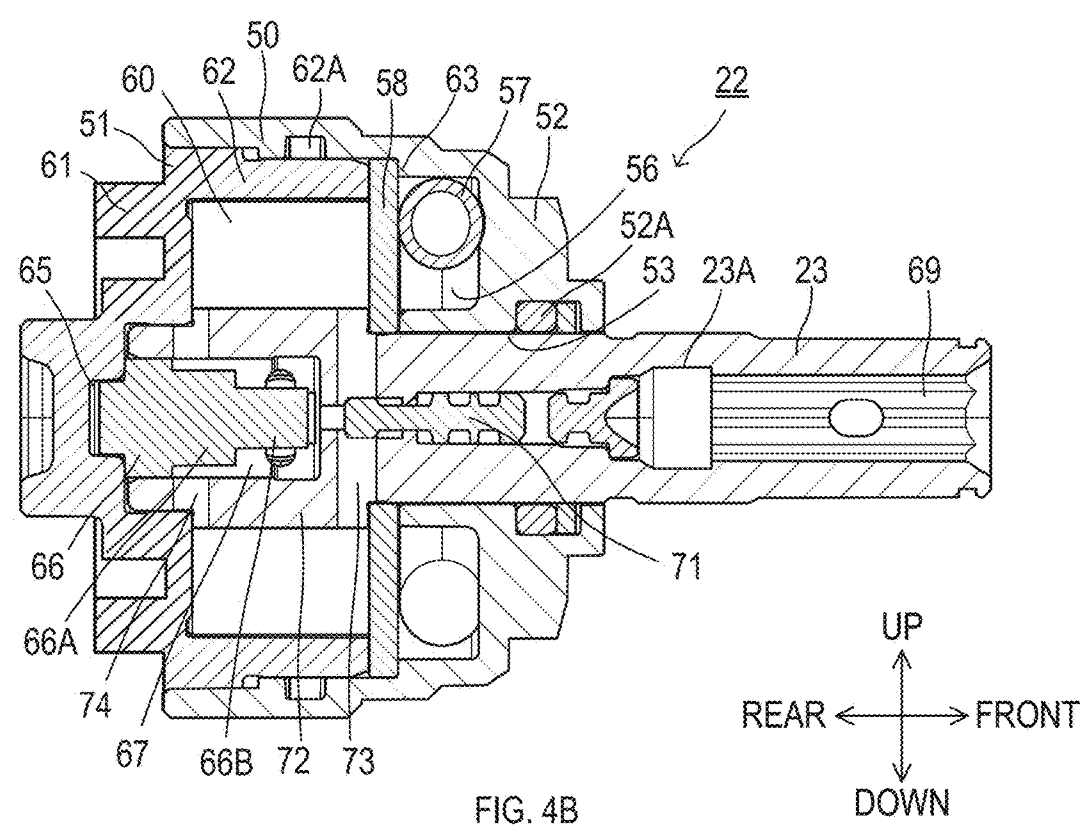
FIG. 4B is a cross-sectional view along a line IVB-IVB in FIG. 4A.

As shown in FIGS. 4A and 4B, the oil unit 22 includes, in addition to the output shaft 23 described above, a front case 50 and the rear case 51. The front case 50 is arranged inside the unit case 7. The front case 50 has a cylindrical shape that tapers gradually toward the front. The front case 50 includes a front end 52 with a retaining hole 53. The output shaft 23 passes through the retaining hole 53. A seal member 52A is provided between the front end 52 and the output shaft 23.

The front end 52 includes a pair of screw holes 54 positioned radially outward from the retaining hole 53. To the pair of the screw holes 54A, a pair of screws 55, which serve as stoppers, are respectively screwed from the front. The front end 52 includes a ring-shaped front chamber 56 therein. The front chamber 56 communicates with the pair of the screw holes 54. The front chamber 56 includes a tube 57 housed therein. The tube 57 (i) is a hollow component filled with air and (ii) is housed in the front chamber 56 in a ring-shaped form. Behind the tube 57, a partition plate 58 is provided. The partition plate 58 includes two or more notches 59 on its outer periphery. Behind the partition plate 58, a rear chamber 60 is provided. The rear chamber 60 communicates with the front chamber 56 via the notches 59.

The rear case 51 includes a central part 61 and a side wall 62. The central part 61 has a disc shape so as to be supported by the bearing 45. The side wall 62 has a cylindrical shape protruding forward from the peripheral edge of the central part 61.

The side wall 62 is screwed into the front case 50 from the rear and is coupled with the front case 50. Between the side wall 62 and the front case 50, a seal member 62A is provided. The side wall 62 includes a front end that is in contact with the partition plate 58. The front case 50 includes a step 63 provided on the inner surface thereof. The partition plate 58 is fixed between the front end of the side wall 62 and the step 63.

Figure 5A:
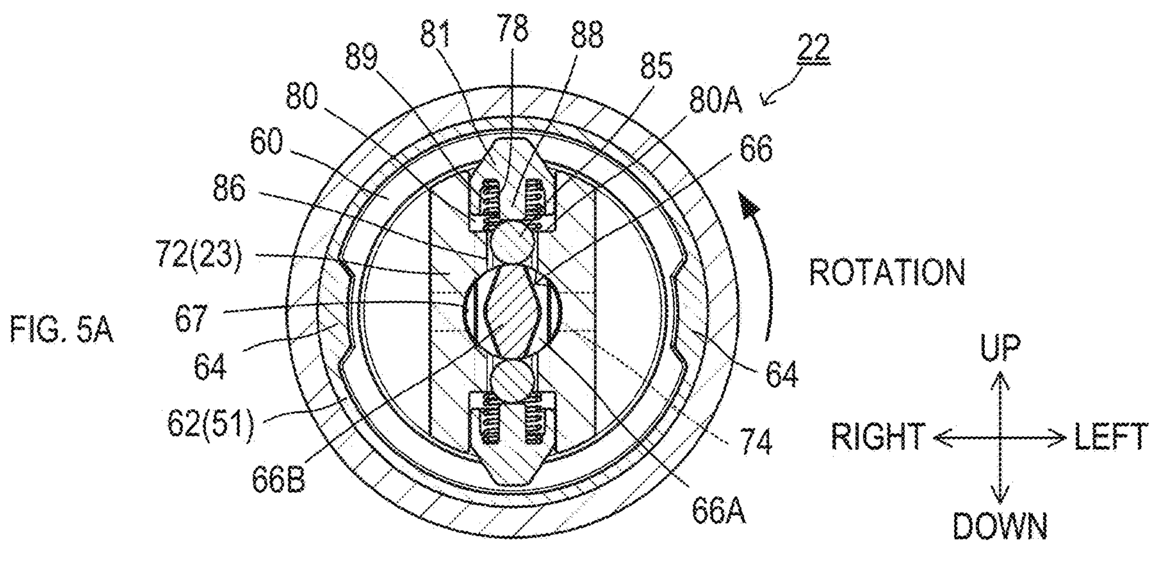
FIG. 5A is a cross-sectional view along a line VA-VA in FIG. 4A.

As shown in FIG. 5A, a pair of projections 64 is provided on the inner surface of the side wall 62. These projections 64 are positioned symmetrically with respect to the axial center of the rear case 51. Each projection 64 protrudes toward the axial center of the rear case 51. In addition, each projection 64 has a tapered cross-sectional shape in which the width in the circumferential direction is narrower toward the axial center.

Referring to FIGS. 4A and 4B again, the central part 61 includes a recess 65 provided in the center thereof. The recess 65 has a two-step concave shape, with the center being deep and the outer side being shallow. In the center of the recess 65, a cam 66 is fixed. The cam 66 extends forward from the recess 65. The cam 66 includes a width-across-flats 66A in its rear part.

The cam 66 includes a flat section 66B in its front portion. The flat section 66B is gradually thinner in the radially outward direction from the thickest center. The width-across-flats 66A and the flat section 66B are oriented orthogonally to a line connecting the centers of the pair of projections 64 in a front view.

The output shaft 23 includes a through hole 23A in its axial center. The rear part of the through hole 23A includes an internal pressure chamber 67 located in the rear chamber 60. The internal pressure chamber 67 includes a circular cross-section. The cam 66 is inserted into the internal pressure chamber 67 so as to rotate relative to each other. The rear end of the output shaft 23 is supported by the recess 65. The middle part of the output shaft 23 is supported by the unit case 7 via the bearing 68 (see FIGS. 2 and 3).

The front part of the through-hole 23A is a mounting hole 69 for inserting a tip tool. A sleeve 70 is provided outside the mounting hole 69 for attaching and detaching the tip tool. Behind the mounting hole 69, an output adjustment plug 71 is arranged so as to block the mounting hole 69. This output adjustment plug 71 is screwed into the through hole 23A.

In the oil unit 22, the front case 50, the rear case 51, a pair of screws 55, the output shaft 23, the output adjustment plug 71, and the like form a sealed space that includes the front chamber 56 and the rear chamber 60. Oil is then sealed in this sealed space. This oil is sealed through the pair of screw holes 54. The oil pressure can be varied by rotating the output adjustment plug 71 with a tool such as a screwdriver inserted into the through hole 23A from the front of the oil unit 22 to adjust the position of the output adjustment plug 71.

As shown in FIG. 5A, the output shaft 23 includes a rear part 72 with a flat cross-sectional shape. The rear part 72 extends in the radial direction of the rear case 51. However, the longitudinal dimension of the rear part 72 is shorter than the distance between the pair of projections 64.

Referring to FIG. 4B again, the rear section 72 is located between the partition plate 58 and the central part 61 of the rear case 51. The front surface of the rear part 72 includes a front communicating hole 73 that extends in the radial direction of the output shaft 23. The front communicating hole 73 connects the through hole 23A with the rear chamber 60 in a state where the rear part 72 is in contact with the partition plate 58. The rear surface of the rear part 72 includes a rear communicating hole 74 that extends in the radial direction of the output shaft 23. The rear communicating hole 74 connects the through hole 23A with the rear chamber 60 in a state where the rear part 72 is in contact with the central part 61.

Referring to FIG. 4A again, a pair of holes 86 is provided in the rear part 72 of the output shaft 23 and radially outward from the cam 66. The pair of holes 86 (i) communicates with the through hole 23A and (ii) extends in the radial direction of the output shaft 23. The pair of holes 86 accommodates a pair of balls 85, respectively. Each ball 85 is movable in the radial direction in the corresponding hole 86. Each ball 85 contacts the flat portion 66B of the cam 66 when the ball 85 moves toward the axial center of the output shaft 23.

The rear part 72 includes a pair of holding grooves 80 provided at both ends of the rear part 72 in the longitudinal direction. The pair of holding grooves 80 communicates with the pair of holes 86, respectively. The pair of holding grooves 80 is provided so as to extend in the radial direction of the rear part 72 at the both ends of the rear part 72 in the longitudinal direction.

The pair of holding grooves 80 includes a pair of blades 81 arranged therein. Each blade 81 has (i) a width that has substantially the same size as that of a circumferential width of the corresponding holding groove 80 and (ii) a length that has substantially the same size as that of the entire length of the corresponding holding groove 80 (i.e., the length between the front and rear portions of the corresponding holding groove 80). Each blade 81 is held in the corresponding holding groove 80 so as to be movable in the radial direction of the output shaft 23. The radially outside edge of each blade 81 is tapered so that the width decreases toward radially outside. Each blade 81 contacts the corresponding ball 85 when the blade 81 moves toward the axial center of the output shaft 23.

Each blade 81 includes a boss 88 on the inner end thereof so as to face the corresponding ball 85. Each boss 88 protrudes further than the inner end of the corresponding blade 81 toward the axial center of the output shaft 23. The axis of each boss 88 is aligned with a line passing through the center of the corresponding ball 85 in the radial direction of the output shaft 23. In other words, the pair of bosses 88 is aligned with the pair of balls 85 in the radial direction of the output shaft 23.

Between each blade 81 and the corresponding boss 88, a ring-shaped groove 89 is provided. Each boss 88 is provided with a corresponding coil spring 78 attached around the boss 88. Each coil spring 78 includes a first end inserted into the corresponding groove 89.

The inner diameter of each coil spring 78 is larger than the outer diameter of the corresponding ball 85. Each coil spring 78 includes a second end that is in contact with a bottom 80A of the corresponding retaining groove 80 around the corresponding ball 85. Each blade 81 is pushed radially outward from the corresponding retaining groove 80 by the biasing force of the corresponding coil spring 78 and the radially outward movement of the corresponding ball 85.

As shown in FIG. 5A, when the flat portion 66B of the cam 66 is oriented parallel to the longitudinal cross-section of the rear part 72 in the internal pressure chamber 67 of the rear part 72, the pair of balls 85 is pushed radially outward by the cam 66. At the same time, the pair of blades 81 is also pushed radially outward by the pair of balls 85.

At this time, the pair of blades 81 comes close to the inner circumferential surface of the rear case 51, but does not come into contact with it, and is positioned to interfere with the pair of projections 64. More specifically, the pair of blades 81 is biased away from the pair of balls 85 to come into contact with the pair of projections 64 by the pair of coil springs 78.

2-1-2. Operation in Oil Pulse Tool

The oil pulse tool 1 configured as described above operates as follows.

When the user pulls the trigger 12, the trigger switch 11 is turned on, and a motor current is delivered from the battery pack 5 to the stator 24 of the electric motor 20, whereby the rotor 25 rotates. The controller 16 receives the rotational position detection signals from the rotational position detector 29A to thereby recognize the rotational position of the rotor 25. The controller 16 then delivers the motor current to the corresponding coils 28 of the stator 24 in accordance with the recognized rotational position. As a result, the rotary shaft 30 rotates together with the rotor 25.

The rotation of the rotary shaft 30 is (i) transmitted to the planetary gears 43 via the pinion 41, (ii) decelerated by the planetary gears 43, and (iii) transmitted from the carrier 44 to the rear case 51 of the oil unit 22.

Figure 5B:
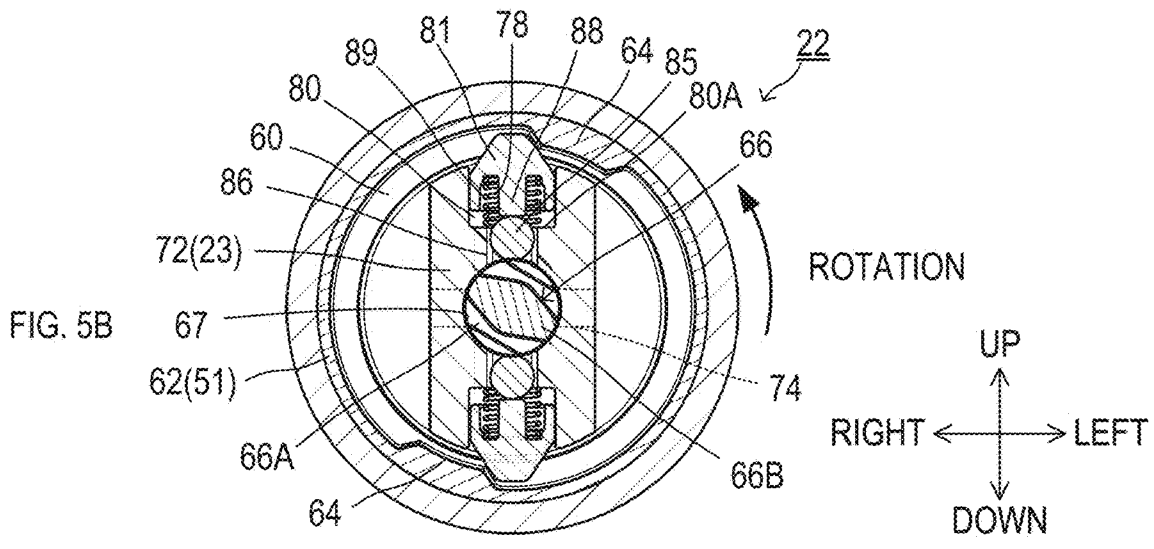
FIG. 5B is a cross-sectional view along the line VA-VA, showing a state immediately before an impact.
Figure 5C:
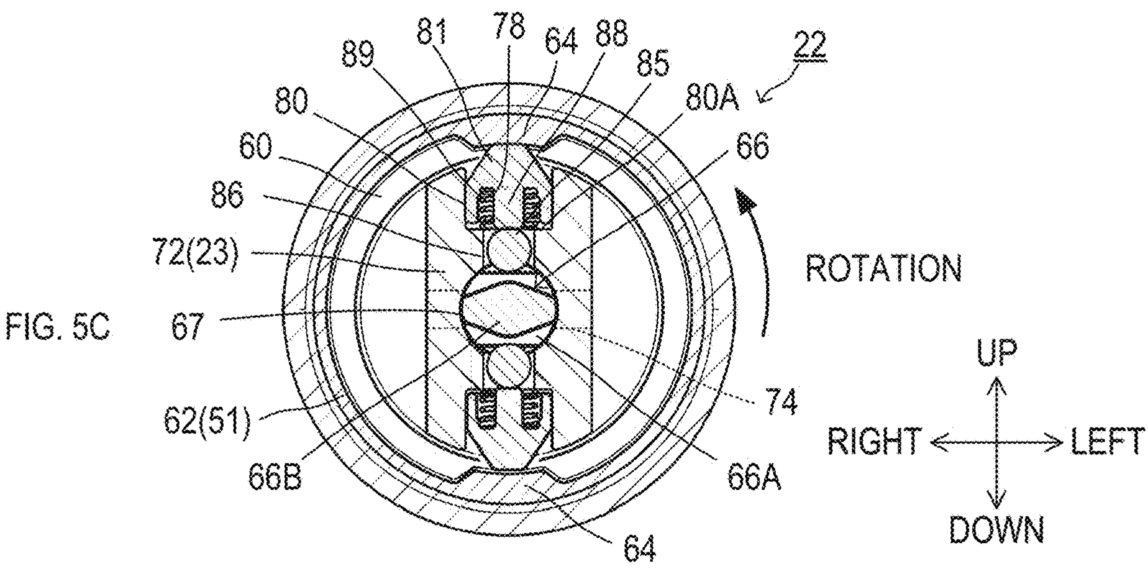
FIG. 5C is a cross-sectional view along the line VA-VA, showing the state after the impact.

As shown in FIGS. 5A through 5C, in the oil unit 22, the cam 66 rotates together with the rear case 51 in the direction indicated by the arrow. The flat part 66B of the cam 66 pushes the pair of blades 81 radially outward from the rear part 72 of the output shaft 23 via the pair of balls 85. In addition, the biasing forces of the pair of coil springs 78 assist the further pushing out of the pair of blades 81.

When the cam 66 rotates further and a space between the rear communicating hole 74 and the internal pressure chamber 67 is opened, the oil flows into the internal pressure chamber 67. The oil flows from the pair of holes 86 into the pair of holding grooves 80, and pushes out the pair of balls 85 and the pair of blades 81 further.

When the cam 66 rotates further together with the rear case 51 and the cam 66 is in a phase where the cam 66 is parallel to the rear part 72 of the output shaft 23, the cam 66 pushes the pair of balls 85 and the pair of blades 81 to their respective outermost positions, as shown in FIG. 5A. The tip of each blade 81 in such a pushed-out position does not reach the inner circumference surface of the rear case 51.

However, at high temperatures, the biasing forces of the pair of coil springs 78 cause the pair of blades 81 to move away from the pair of balls 85 and to be pushed further radially outward. When the rear case 51 and the cam 66 rotate further and the pair of projections 64 collides with the pair of blades 81, as shown in FIG. 5B, the cam 66 closes the gap between the rear communicating hole 74 and the internal pressure chamber 67.

Subsequently, the oil pressure in the inner pressure chamber 67 increases to cause the inner pressure chamber 67 to serve as a high-pressure chamber of the oil, and the pair of blades 81 is held in the respective pushed-out positions. This makes the pair of projections 64 collide with the pair of blades 81 to thereby apply an impact torque (i.e., an impact) to the output shaft 23.

The pair of blades 81 moves back with a large stroke from the inner surface of the rear case 51. However, the respective biasing forces of the pair of coil springs 78 act as resistive forces to the backward movement. Therefore, the reduction of the impact torque is suppressed even if the viscosity of the oil is low.

After the impact is applied, the pair of blades 81 is retracted toward the axial center of the output shaft 23 by the guidance of the tapered portions of the pair of projections 64 and the tapered portions of the pair of blades 81. Thus, as shown in FIG. 5C, each of the retracted blades 81 passes over the corresponding protrusions 64. Then, when each protrusion 64 passes the corresponding blade 81, the portion between the rear communicating hole 74 and the internal pressure chamber 67 is opened by the rotation of the rear case 51 and the cam 66. Thus, the cam 66 pushes out the pair of blades 81 again via the pair of balls 85.

Therefore, when the load is applied from the tip tool to the output shaft 23 and the rotation of the output shaft 23 stops or slows down, the above-mentioned operation is performed repeatedly, which causes two impact torques to be generated per rotation of the rear case 51.

In the oil pulse tool 1 of this first embodiment, when the temperature of the oil unit 22 is low and the viscosity of the oil is high, the respective strokes of the pair of blades 81 can be ensured by the cam 66 and the pair of balls 85. As a result, necessary torque can be obtained.

When the temperature of the oil unit 22 is high and the viscosity of the oil is low, the biasing forces of the pair of coil springs 78 can increase the resistances to the backward movements of the pair of blades 81. As a result, the decrease in torque can be inhibited.

Therefore, the torque of the oil unit 22 can be leveled regardless of temperature changes, and good work efficiency can be maintained.

In the oil unit 22, the pair of projections 64 of the rear case 51 collides with the pair of blades 81 to apply impact torque on the output shaft 23. This collision occurs frequently when a load is applied to the output shaft 23 from the tip tool. In the oil unit 22, when a load is applied from the tip tool to the output shaft 23, and a predetermined phase difference occurs between the rotation of the rear case 51 and the rotation of the output shaft 23, an impact is applied to the output shaft 23. Thus, impacts can frequently occur when tightening screws, and the like.

The heat is generated by the impacts. Therefore, when the count of impacts increases, the oil temperature rises. This may lead to a decrease in performance of the oil unit 22 by oil leaks or failures in pressure adjustment components due to oil expansion.

In this first embodiment, the controller 16 measures a count of impacts per specified time applied to the output shaft 23 and calculates an estimated temperature value of the oil unit 22 based on the measurement result.

When the estimated temperature value exceeds a predetermined high-temperature determination value, the controller 16 stops a rotation of the electric motor 20 and notifies a user of the rotation stop of the electric motor 20. In addition, the controller 16 generates an alarm before stopping the rotation of the electric motor 20. The notification of the rotation stop and the generation of the alarm are performed by lighting or blinking the one or more LEDs of the indicator 19 on the switch panel 18.

2-1-3. Electrical Configuration of Oil Pulse Tool

Figure 6:
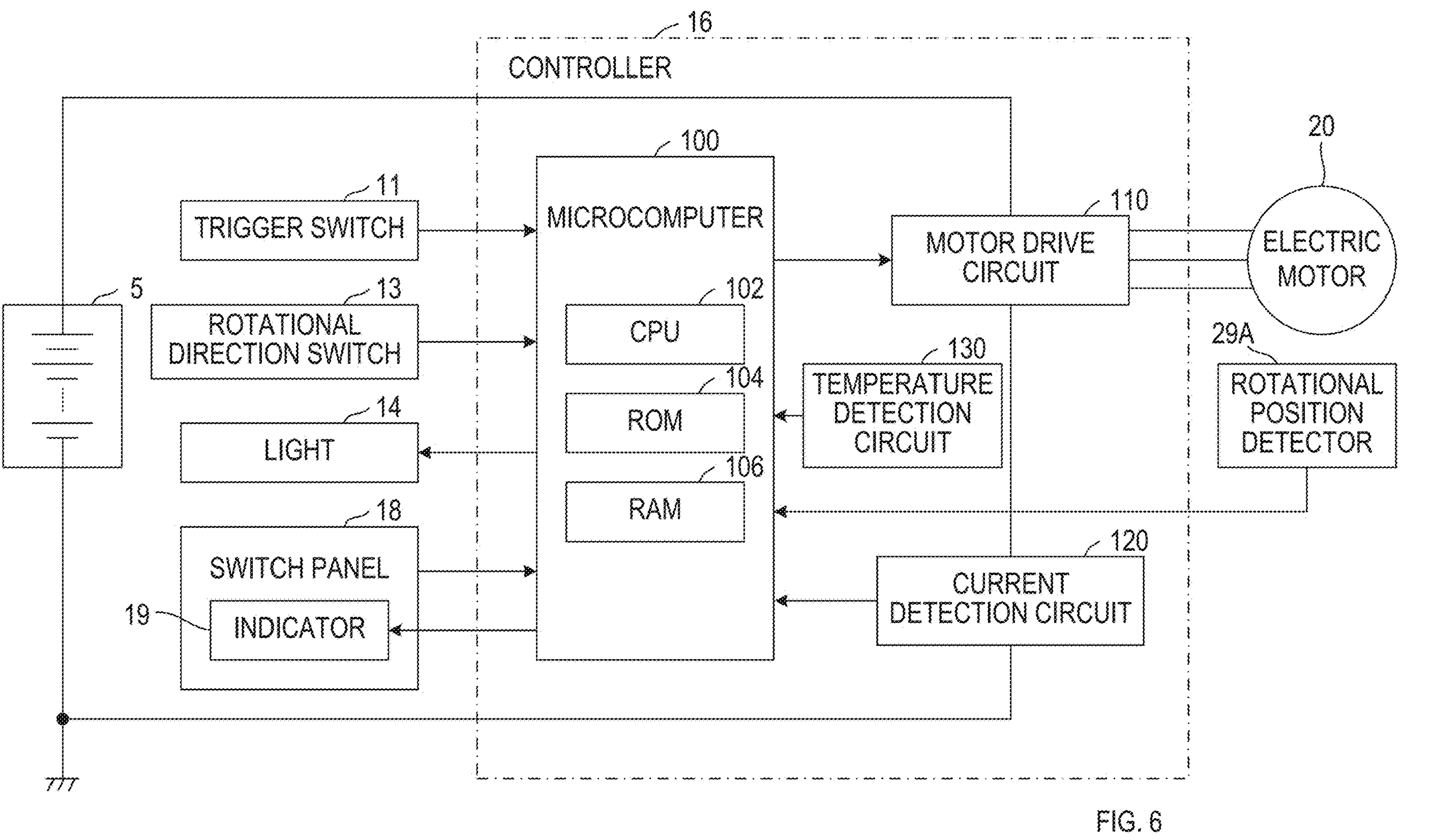
FIG. 6 is a block diagram showing an electrical configuration of the oil pulse tool.

As shown in FIG. 6, the controller 16 includes a microcomputer (or a microprocessor or a microcontroller) 100, a motor drive circuit 110, a current detection circuit 120, and a temperature detection circuit 130.

The microcomputer 100 includes a CPU 102, a ROM 104, a RAM 106, and not-shown input/output (I/O) ports. In another embodiment, the controller 16 may include an additional microcomputer. In yet another embodiment, the controller 16 may include, in addition to or in place of the microcomputer 100, a logic circuit (or a wired logic connection) that includes two or more electronic components. In yet another embodiment, the controller 16 may include, in addition to or in place of the microcomputer 100, a GPU, an ASIC, an ASSP, and/or a PLD.

The motor drive circuit 110 is coupled to the coils 28 of the electric motor 20, to the positive electrode of the battery pack 5, and to the negative electrode of the battery pack 5. The motor drive circuit 110 (i) includes a three-phase full-bridge inverter and (ii) is configured to deliver or interrupt the motor current from the battery pack 5 to the coils 28 of the electric motor 20. In another embodiment, the motor drive circuit 110 may include a single-phase full-bridge inverter, a two-phase full-bridge inverter, or a four or more-phase full-bridge inverter. In yet another embodiment, the motor drive circuit 110 may include any half-bridge inverter.

The microcomputer 100 transmits pulse-width modulated (PWM) signals to six semiconductor switches of the three-phase full-bridge inverter in the motor drive circuit 110 so as to maintain an actual rotational speed of the electric motor 20 at a desired rotational speed. The desired rotational speed is set in accordance with a pulled distance of the trigger 12.

The current detection circuit 120 is configured (i) to detect the magnitude of the motor current delivered to the electric motor 20 via the motor drive circuit 110 and (ii) to transmit a current detection signal to the microcomputer 100. The current detection signal has an analog voltage that corresponds to the magnitude of the motor current detected by the current detection circuit 120. The current detection circuit 120 may include a shunt resistor on a current path that extends from the motor drive circuit 110 to the negative electrode of the battery pack 5.

The temperature detection circuit 130 is configured (i) to detect the temperature of the controller 16 and (ii) to transmit a temperature detection signal to the microcomputer 100. The temperature detection signal has an analog voltage that corresponds to the temperature detected by the temperature detection circuit 130. The temperature detection circuit 130 may include a thermistor.

The microcomputer 100 is coupled to the rotational position detector 29A to receive the rotational position detection signals from the rotational position detector 29A.

In addition, the microcomputer 100 is also coupled to the trigger switch 11, to the rotational direction switch 13, to the light 14, to the switch panel 18, and to the indicator 19 of the switch panel 18.

When the trigger switch 11 is turned on, the microcomputer 100 transmits, to the motor drive circuit 110, the PWM signals for rotating the electric motor 20. The PWM signals correspond to (i) the pulled distance of the trigger 12 and (ii) the rotational direction set by the rotational direction switch 13.

The microcomputer 100 (i) turns on or off the light 14 or (ii) sets the desired rotational speed of the electric motor 20 to high speed or low speed, according to the respective states of the various switches on the switch panel 18.

The microcomputer 100 detects the impact applied to the output shaft 23 in the oil unit 22 based on the current detection signal or the rotational position detection signals.

The microcomputer 100 (i) estimates the actual temperature of the oil unit 22 based on the count of impacts within a predetermined time period, or in other words, the frequency of impacts and (ii) stops the rotation of the electric motor 20 and issues an alarm to protect the oil unit 22 when the actual temperature is estimated being high.

2-1-4. Control Process

The control process executed by the microcomputer 100 (more specifically, the CPU 102) is described below.

The microcomputer 100 initiates the control process every time a predetermined control cycle (for example, several milliseconds) elapses.

Figure 7:
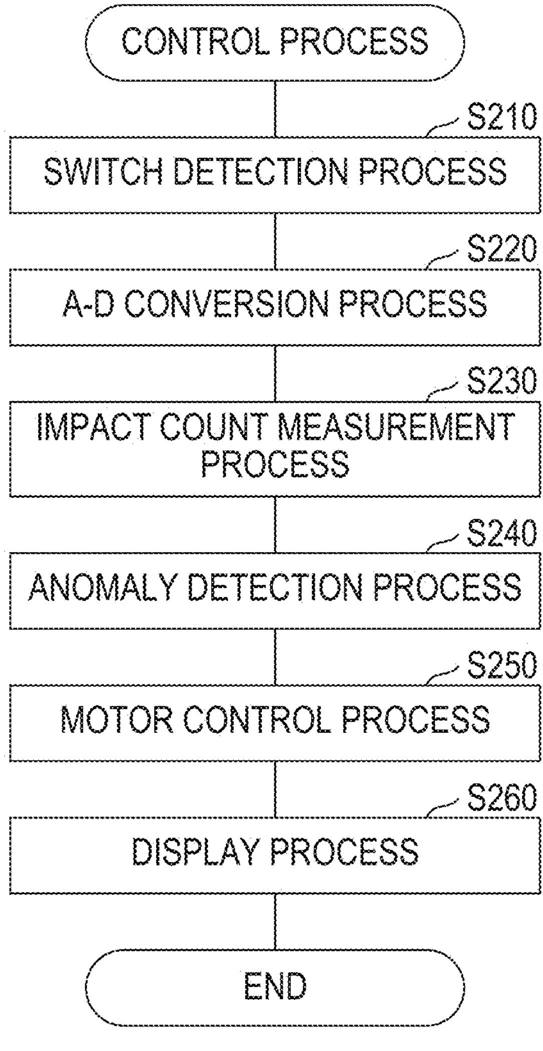
FIG. 7 is a flowchart of a control process.

As shown in FIG. 7, the microcomputer 100 executes the processes from S210 through S260 (S indicates a step) within the control cycle.

Specifically, in S210, the microcomputer 100 executes a switch detection process. In the switch detection process, the microcomputer 100 detects the respective states of the trigger switch 11, the rotational direction switch 13, and the various switches on the switch panel 18.

In S220, the microcomputer 100 executes an analog-to-digital (A-to-D) conversion process. In the A-to-D conversion process, the microcomputer 100 converts the analog voltage of the current detection signal and the analog voltage of the temperature detection signal into the respective digital values to obtain the respective digital values of the magnitude of the motor current and the temperature of the controller 16.

In addition, the microcomputer 100 sets an alarm determination value TH1 and a high-temperature determination value TH2 based on the initial temperature of the controller 16 obtained immediately after the microcomputer 100 is booted.

The initial temperature of the controller 16 corresponds to the ambient temperature of the oil pulse tool 1. The actual temperature of the oil unit 22 is prone to rise as the ambient temperature is high. Therefore, the microcomputer 100 sets the alarm determination value TH1 and the high-temperature determination value TH2 to low values as the ambient temperature is high.

In S230, the microcomputer 100 executes an impact count measurement process. In the impact count measurement process, the microcomputer 100 measures a count of impacts applied to the output shaft 23 based on the change in the magnitude of the motor current obtained in the A-to-D conversion process.

In S240, the microcomputer 100 executes an anomaly detection process. In the anomaly detection process, the microcomputer 100 (i) detects an anomalous rotation of the electric motor 20 based on the rotational position detection signals, (ii) detects an anomalous output voltage of the battery pack 5, or (iii) detects an anomalous temperature rise of the controller 16 based on the temperature detection signal. The anomaly detection process includes a later-described first protection process. Therefore, the microcomputer 100 executes the first protection process in S240.

In S250, the microcomputer 100 executes a motor control process. In the motor control process, the microcomputer 100 transmits the PWM signals to the motor drive circuit 110 so as to maintain the actual rotational speed of the electric motor 20 at the desired rotational speed. The actual rotational speed is calculated based on the rotational position detection signals. In a case where any anomaly is detected in the anomaly detection process in S240, the microcomputer 100 transmits, to the motor drive control 110, the PWM signals for interrupting the motor current to stop the rotation of the electric motor 20.

In S260, the microcomputer 100 executes a display process. In the display process, the microcomputer 100 indicates, on the indicator 19, (i) a state of the electric motor 20 and/or (ii) any anomaly detected in the anomaly detection process, by lighting or blinking the one or more LEDs of the indicator 19.

2-1-4-1. First Protection Process

The following describes the first protection process included in the anomaly detection process.

Figure 8:
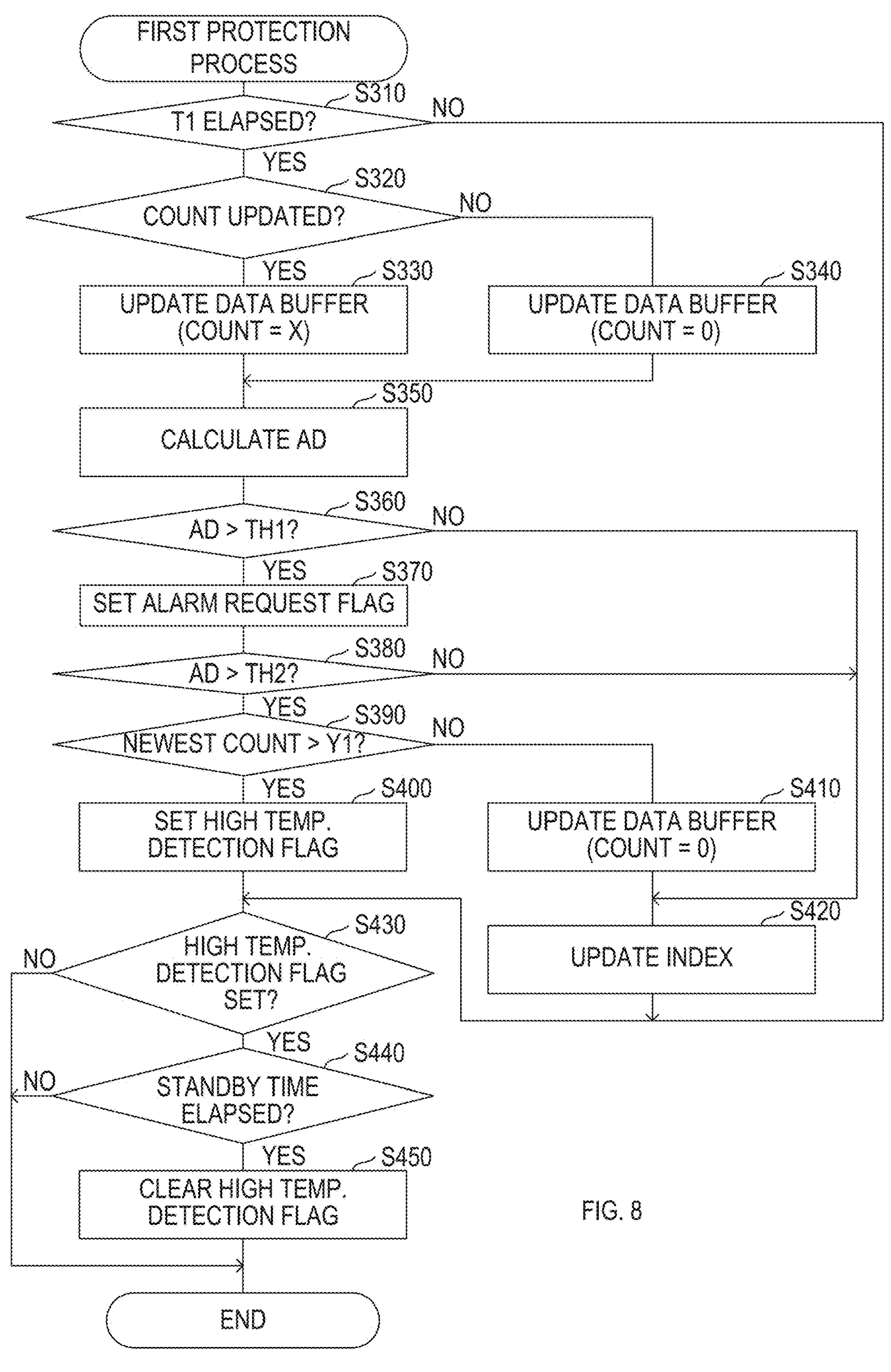
FIG. 8 is a flowchart of a first protection process.

As shown in FIG. 8, in the first protection process, the microcomputer 100 first, in S310, determines whether a first preset time period T1 (e.g., 1 second) has elapsed since the start of the process in the previous S320. If the first preset time period T1 has not elapsed (S310: NO), the microcomputer 100 proceeds to S430.

If the first preset time period T1 has elapsed (S310: YES), the microcomputer 100 proceeds to S320. In S320, the microcomputer 100 determines whether the count of impacts has been updated to a count greater than zero in the impact count measurement process in S230 during the first preset time period T1.

If the count of impacts has been updated to a count greater than zero (S320: YES), then the microcomputer 100 proceeds to S330. In S330, the microcomputer 100 stores the updated current count of impacts in one of a first series of data buffers. In addition, the microcomputer 100 initializes the count of impacts measured in S230 to zero and proceeds to S350. The first series of data buffers is allocated in the RAM 106. The first series of data buffers includes n data buffers (where n is any natural number greater than or equal to 2). In this first embodiment, the first series of data buffers includes six or more data buffers.

In S320, if the count of impacts has not been updated to a count greater than zero during the first preset time period T1 in S320 (S320: NO), the microcomputer 100 proceeds to S340. In S340, the microcomputer 100 stores the current count of impacts, which is zero, in one of the first series of data buffers and proceeds to S350.

Figure 9:
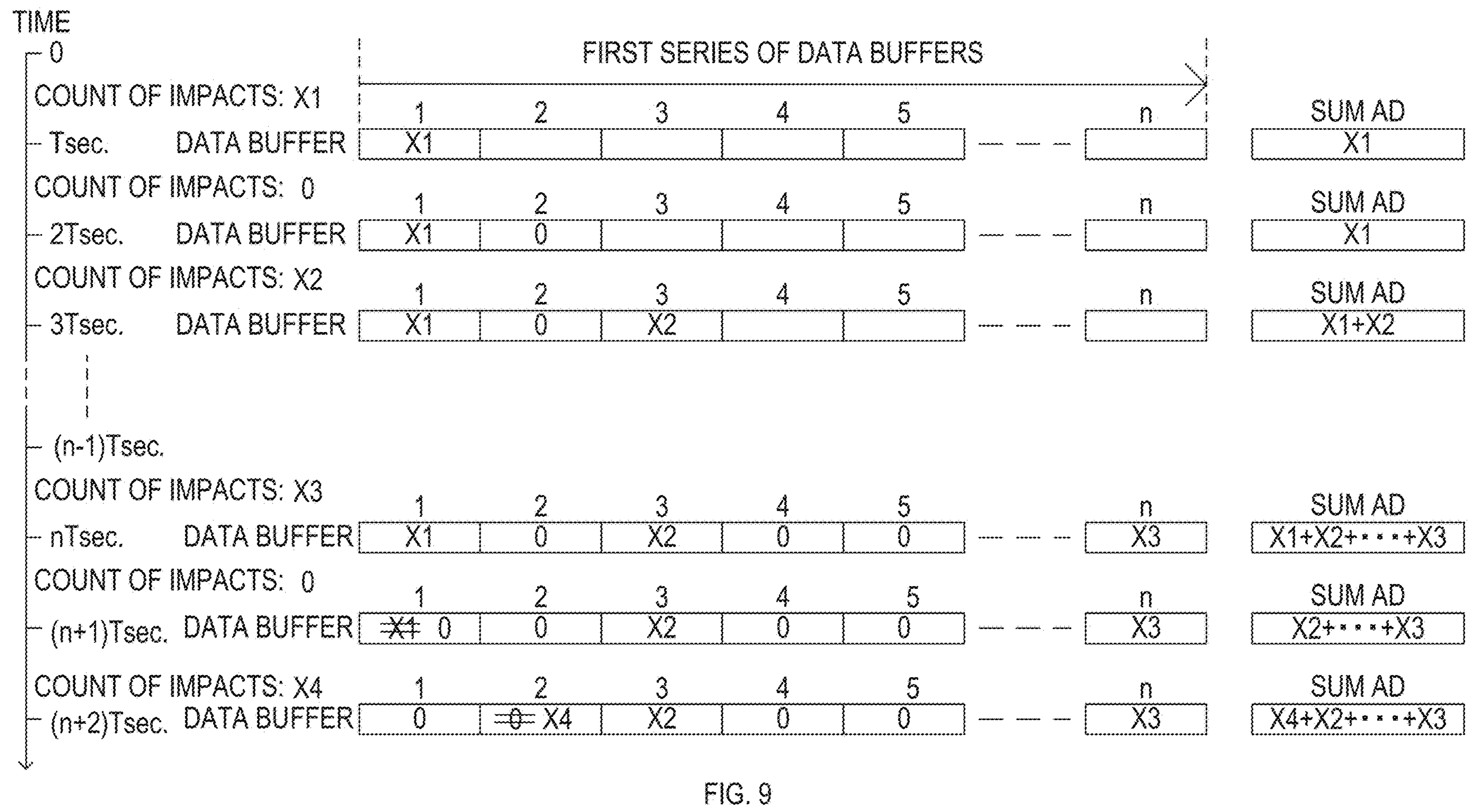
FIG. 9 is an explanatory diagram illustrating a configuration of a first series of data buffers and their operations.

As shown in FIG. 9, the microcomputer 100 sequentially stores a series of counts of impacts (e.g., X1, 0, X2, . . . ) each measured during every first preset time period T1 in the first series of data buffers every time the first preset time period T1 elapses.

More specifically, in S320, the microcomputer 100 sequentially writes the series of counts of impacts each measured during every first preset time period T1 in the first series of data buffers from the first buffer to the nth buffer every time the first preset time period T1 elapses. The microcomputer 100 writes the newest count of impacts in the first data buffer when the first preset time period T1 elapses after the previous count of impacts is written in the nth data buffer. Thereafter, the microcomputer 100 writes the newest count of impacts in the first series of data buffers from the second data buffer to the nth data buffer every time the first preset time period T1 elapses.

A sum AD of the series of counts of impacts stored in the first series of data buffers corresponds to a count of impacts measured within a second preset time period T2 that is determined by the first preset time period T1 and the total number of the data buffers (i.e., T2=n×T1), in other words, the frequency of impacts per the second preset time period T2.

Referring to FIG. 8 again, in S350, the microcomputer 100 calculates the sum AD as the estimated temperature value of the oil unit 22. In the subsequent S360, the microcomputer 100 determines whether the calculated sum AD exceeds the alarm determination value TH1 that is set in S220.

If the sum AD does not exceed the alarm determination value TH1 (S360: NO), the microcomputer 100 proceeds to S420. If the sum AD exceeds the alarm determination value TH1 (S360: YES), the microcomputer 100 proceeds to S370 to set an alarm request flag. When the alarm request flag is set, the microcomputer 100 issues the alarm by lighting or blinking the one or more LEDs of the indicator 19 in the display process in S260. This alarm allows the user to recognize the rise in the actual temperature of the oil unit 22. Subsequently, the user can cool down the oil unit 22 by driving the electric motor 20 with no-load to generate airflow from the fan 35 to the oil unit 22.

In subsequent S380, the microcomputer 100 determines whether the sum AD exceeds the high-temperature determination value TH2 that is set in S220.

If the sum AD does not exceed the high-temperature determination value TH2 (S380: NO), the microcomputer 100 proceeds to S420. If the sum AD exceeds the high-temperature determination value TH2 (S380: YES), the microcomputer 100 proceeds to S390 to determine whether the newest count of impacts stored in the first series of data buffers in S330 is greater than a first preset temperature rise determination value Y1.

The first preset temperature rise determination value Y1 is a threshold to determine whether the newest count of impacts measured within the most recent first preset time period T1 corresponds the count of impacts that can cause the actual temperature of the oil unit 22 to rise. If the newest count of impacts is less than the first preset temperature rise determination value Y1, the actual temperature of the oil unit 22 may not rise due to the air flow supplied from the fan 35 to the oil unit 22. Thus, in S390, the microcomputer 100 determines whether the newest count of impacts is greater than the first preset temperature rise determination value Y1.

If the newest count of impacts is greater than the first preset temperature rise determination value Y1 (S390: YES), the microcomputer 100 proceeds to S400. In S400, the microcomputer 100 sets a high-temperature detection flag, and proceeds to S430.

When the high-temperature detection flag is set, the microcomputer 100 stops the rotation of the electric motor 20 in the motor control process in S250. As a result, the rise of the actual temperature of the oil unit 22 is inhibited, and the oil unit 22 is protected from the high-temperature.

In addition, the microcomputer 100 notifies the user of the stop of the electric motor 20 by lighting or blinking the one or more LEDs on the indicator 19 in the display process in S260. In another embodiment, the microcomputer 100 may generate an alarm sound or a notification sound with the one or more LEDs on the indicator 19 lighted or blinked in the display process in S260. In yet another embodiment, the microcomputer 100 may notify the user of the stop of the electric motor 20 or generate an alarm by blinking the light 14 in addition to or in place of the one or more LEDs on the indicator 19 in a predetermined pattern in the display process in S260.

If the newest count of impacts is less than or equal to the first preset temperature rise determination value Y1 (S390: NO), it is estimated that the actual temperature of the oil unit 22 will not rise, and the microcomputer 100 proceeds to S410. In S410, the microcomputer 100 writes the count of impacts, which is zero, in the data buffer in which the count of impacts is written in S330, and proceeds to S420.

In S420, the microcomputer 100 updates an index that stores an address of the data buffer to store the next count of impacts, and proceeds to S430.

In S430, the microcomputer 100 determines whether the high-temperature detection flag is set. If the high-temperature detection flag is cleared (S430: NO), the microcomputer 100 immediately terminates the first protection process. If the high-temperature detection flag is set (S430: YES), the microcomputer 100 proceeds to S440. In

S440, the microcomputer 100 determines whether a preset standby time has elapsed since the high-temperature detection flag was set.

If the preset standby time has not elapsed (S440: NO), the microcomputer 100 immediately terminates the first protection process. If the preset standby time has elapsed (S440: YES), the microcomputer 100 proceeds to S450. In S450, the microcomputer 100 clears the high-temperature detection flag and the alarm request flag, and terminates the first protection process.

2-1-5. Operations and Effects in First Embodiment

The oil pulse tool 1 in the first embodiment calculates the frequency of impacts applied to the output shaft 23 as the sum AD of the series of counts of impacts during the second preset time period T2, using the first series of data buffers.

The calculated sum AD corresponds to the estimated temperature of the oil unit 22. If the sum AD exceeds the high-temperature determination value TH2, the oil pulse tool 1 stops the rotation of the electric motor 20. Therefore, it is possible to reduce failures in the oil unit 22 such as oil leaks caused by the rise of the actual temperature of the oil unit 22.

If the sum AD exceeds the alarm determination value TH1, the oil pulse tool 1 generates an alarm for the user by lighting or blinking the one or more LEDs on the indicator 19. With the alarm, the user can recognize the rise of the actual temperature of the oil unit 22 before the rotation of the electric motor 20 is stopped by the microcomputer 100. As a result, the user can operate the oil pulse tool 1 so as to suppress the rise of the actual temperature of the oil unit 22.

The high-temperature determination value TH2 and the alarm determination value TH1 are set to be low when the initial temperature of the controller 16, in other words, the ambient temperature of the oil pulse tool 1 is high. Thus, the oil pulse tool 1 can recognize the rise of the actual temperature of the oil unit 22 more accurately and protect the oil unit 22 from the high temperature in an environment where the actual temperature of the oil unit 22 is prone to rise.

When the sum AD becomes greater than the high-temperature determination value TH2 and the high-temperature detection flag is set, the drive of the electric motor 20 is prohibited, but after the preset standby time has elapsed, the high-temperature detection flag is cleared and the drive of the electric motor 20 is permitted.

Thus, the drive of the electric motor 20 is automatically permitted when the oil unit 22 is cooled down and the actual temperature of the oil unit 22 is lowered. This allows the user to promptly resume work using the oil pulse tool 1.

2-1-6. Correspondence Between Terms

In this first embodiment, the motor control circuit in the overview of embodiments is exemplified as the microcomputer 100 executing the process in S250. The impact measurement circuit in the overview of embodiments is exemplified as the microcomputer 100 executing the process in S230. The temperature estimation circuit in the overview of embodiments is exemplified as the microcomputer 100 executing the processes in S320 through S350. The protection operation circuit in the overview of embodiments is exemplified as the microcomputer 100 executing the processes in S220, and S360 through S450. The first protection threshold in the overview of embodiments is exemplified as the alarm determination value TH1 or the high-temperature determination value TH2. The lower limit count in the overview of embodiments is exemplified as the count of zero. The impact mechanism in the overview of embodiments is exemplified as a combination of the pair of projections 64, the cum 66, the pair of coil springs 78, the pair of balls 85, and the pair of blades 81.

2-2. First Variation

The count of impacts that can occur per work may differ between (i) heavy-load work where the load applied from the tool bit to the electric motor 20 via the output shaft 23 is large, and (ii) medium-load work where the load applied to the electric motor 20 is smaller than that in the heavy-load work. Specifically, the count of impacts per work may be greater in the heavy-load work than that in the medium-load work.

Therefore, when the heavy-load work is repeated, the actual temperature of the oil unit 22 can rise more rapidly than that in the case where the medium-load work is repeated.

In the first embodiment as described above, the first series of data buffers includes n data buffers. However, if the sum AD is calculated using the first series of data buffers in both the heavy-load work and the medium-load work, there may be cases where the oil unit 22 cannot be protected from the high temperature in the heavy-load work or in the medium-load work.

Specifically, if the number of data buffers, the alarm determination value TH1, and the high-temperature determination value TH2 are set so as to be suitable for the heavy-load work, the actual temperature of the oil unit 22 may rise to a risky level in the medium-load work. Alternatively, if the number of data buffers, the alarm determination value TH1, and the high-temperature determination value TH2 are set so as to be suitable for the medium-load work, the actual temperature of the oil unit 22 may rise to a risky level in the heavy-load work.

In order to suppress these situations from occurring, in this first variation, in addition to the first series of data buffers, a second series of data buffers is allocated in the RAM 106.

Figure 10:
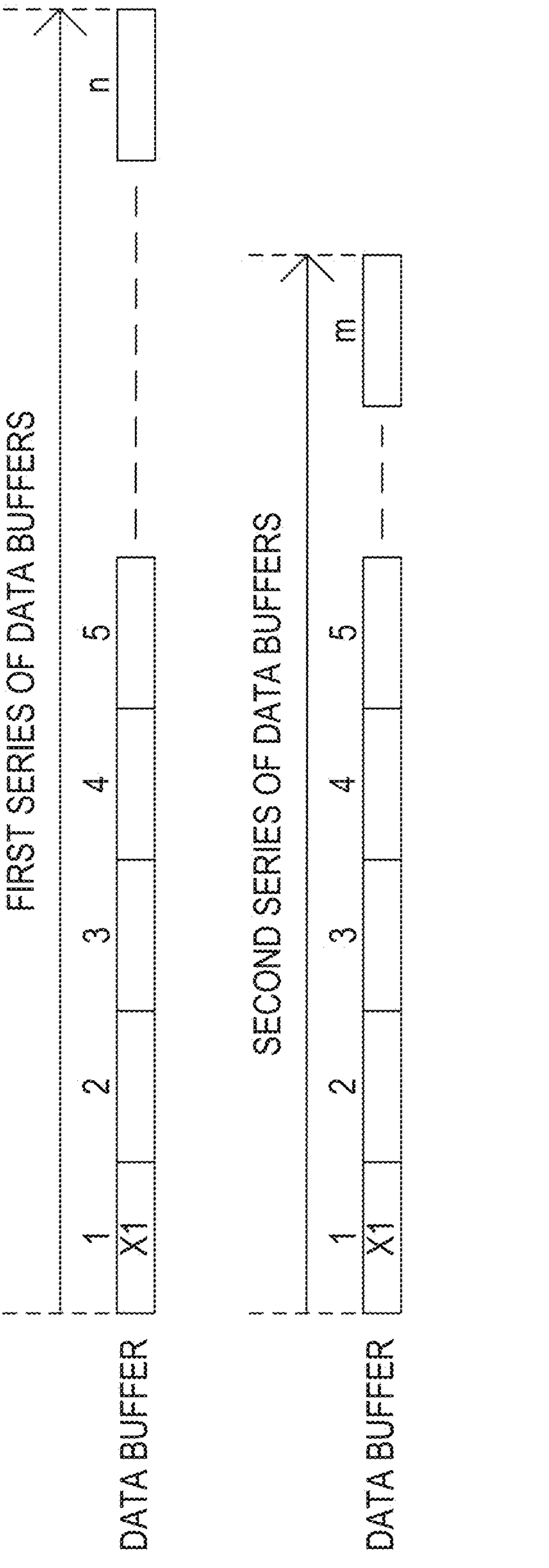
FIG. 10 is a schematic diagram showing respective examples of the first series of data buffers and a second series of data buffers.

As shown in FIG. 10, the second series of data buffers includes m data buffers (where m is any natural number greater than or equal to 2 and less than n).

In the first protection process, the microcomputer 100 (i) sequentially stores the series of counts of impacts in the heavy-load work in the second series of data buffers and (ii) sequentially stores the series of counts of impacts in the medium-load work in the first series of data buffers.

In addition, the microcomputer 100 (i) sets the alarm determination value TH1 and the high-temperature determination value TH2 suitable for the heavy-load work when the heavy-load work is performed and (ii) sets the alarm determination value TH1 and the high-temperature determination value TH2 suitable for the medium-load work when the medium-load work is performed. The alarm determination value TH1 suitable for the heavy-load work is smaller than the alarm determination value TH1 suitable for the medium-load work. The high-temperature determination value TH2 suitable for the heavy-load work is smaller than the high-temperature determination value TH2 suitable for the medium-load work.

In the first variation as described in the above, the oil unit 22 can be protected from the high temperature not only in the heavy-load work but also in the medium-load work.

2-3. Second Variation

In the above first embodiment, the microcomputer 100 stops the rotation of the electric motor 20 in the motor control process in S250 when the high-temperature detection flag is set. However, when the electric motor 20 is driven without a load, no impact occurs in the oil unit 22, and therefore, the actual temperature of the oil unit 22 does not rise. In addition, the airflow generated by the fan 35 can promote the cooling of the oil unit 22, thereby lowering the actual temperature of the oil unit 22.

Therefore, in the motor control process in this second variation, the microcomputer 100 may drive the electric motor 20 when (i) the high-temperature detection flag is set and (ii) no load is applied to the electric motor 20. Whether a load is applied to the electric motor 20 can be determined based on the magnitude of the motor current.

In this case, the preset standby time in S440 may be adjusted depending on whether a load is applied to the electric motor 20.

In a case where the electric motor 20 is driven with no load when the high-temperature detection flag is set, the actual temperature of the oil unit 22 is promptly lowered. Therefore, when the electric motor 20 is driven with no load, the standby time can be shortened. As a result, the usability of the oil pulse tool 1 can be improved.

2-4. Second Embodiment

In the above first embodiment, in order to calculate the estimated temperature value of the oil unit 22, the microcomputer 100 stores the series of counts of impacts, each of which is measured during every first preset time period T1, in the first series of data buffers.

However, such a calculation method requires a memory capacity for n data buffers in the microcomputer 100.

Figure 11:
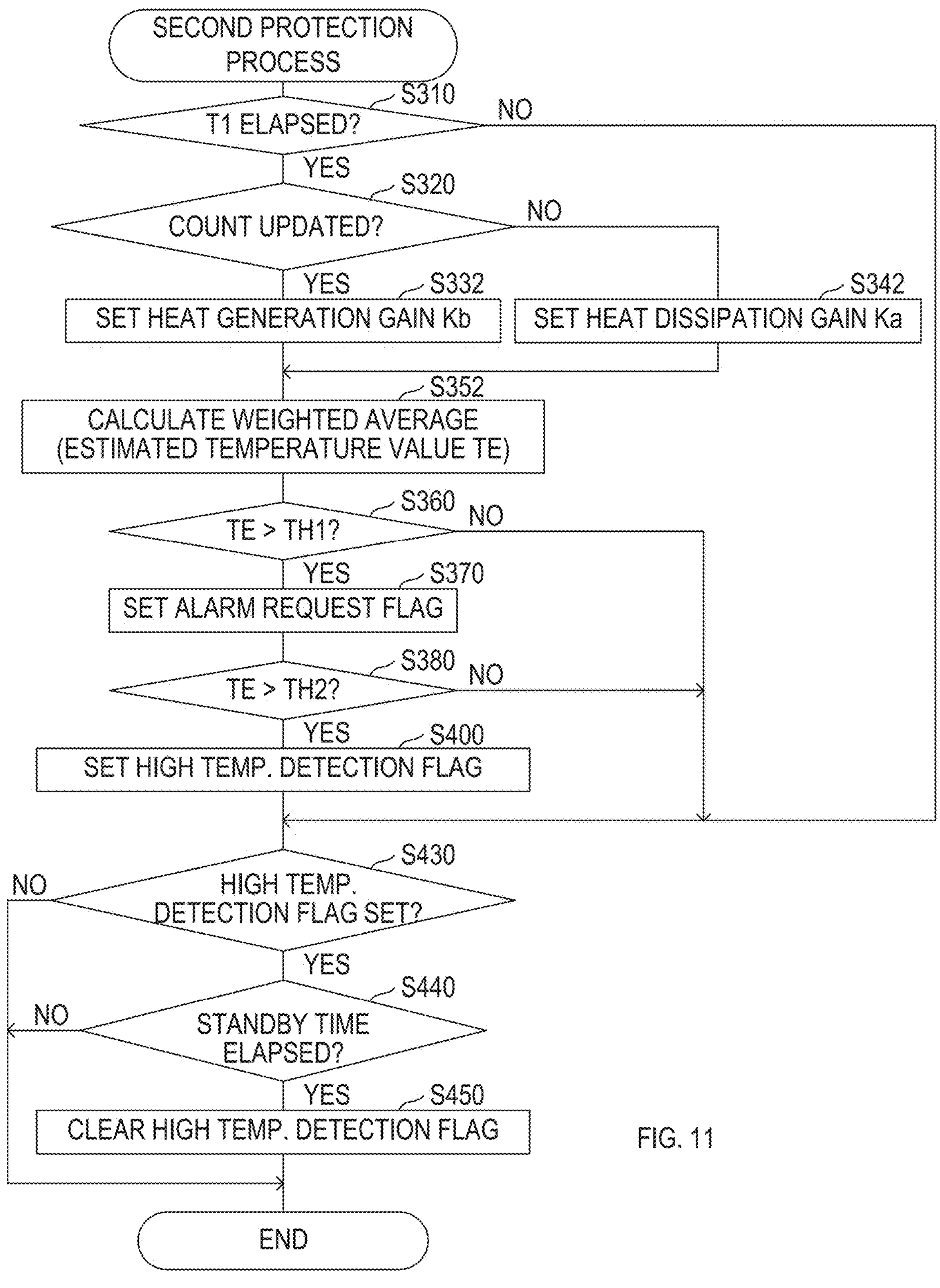
FIG. 11 is a flow chart of a second protection process.

In this second embodiment, in order to reduce the memory capacity for calculating the estimated temperature value, the microcomputer 100 executes a second protection process shown in FIG. 11, in place of the first protection process. The second protection process corresponds to the first protection process partially modified.

As shown in FIG. 11, in the second protection process, the microcomputer 100 determines in S310 whether the first preset time period T1 (e.g., 1 second) has elapsed since the start of the process in the previous S320, as in the first protection process. If the first preset time period T1 has not elapsed (S310: NO), the microcomputer 100 terminates the second protection process.

If the first preset time period T1 has elapsed (S310: YES), the microcomputer 100 proceeds to S320. In S320, the microcomputer 100 determines whether the count of impacts has been updated to a count greater than zero in the impact count measurement process in S230 during the first preset time period T1.

If the count of impacts has been updated to a count greater than zero (S320: YES), then the microcomputer 100 proceeds to S332. In S332, the microcomputer 100 sets a heat generation gain Kb as a filter gain K used to calculate a weighted average WA of the count of impacts and proceeds to S352. The heat generation gain Kb is predetermined in consideration of the temperature rise caused by impacts. In addition, in S332, the microcomputer 100 initializes the count of impacts measured in S230 to zero.

In S320, if the count of impacts has not been updated to a count greater than zero during the first preset time period T1 (S320: NO), the microcomputer 100 proceeds to S342. In S342, the microcomputer 100 sets a heat dissipation gain Ka as the filter gain K and proceeds to S352. In a case where the count of impacts is zero, the oil unit 22 does not generate heat due to impacts. The heat dissipation gain Ka is predetermined in consideration of no heat generated in the oil unit 22 due to no impact.

Specifically, each of the heat dissipation gain Ka and the heat generation gain Kb is greater than zero and less than one. Each of the heat dissipation gain Ka and the heat generation gain Kb is set such that the weighted average WA of the count of impacts corresponds to the count of impacts actually generated and the actual temperature change (the actual value) of the oil unit 22.

In S352, the microcomputer 100 calculates the weighted average WA based on the following formula (1).

$$WA = WAbf \times (1 - K) + An \times K \tag{1}$$

In formula (1), WAbf is the weighted average WA previously calculated, and An is the newest count of impacts counted during the first preset time period T1. The filter gain K is the heat dissipation gain Ka or the heat generation gain Kb set as the filter gain K in S332 or S342.

In addition, in S352, the microcomputer 100 multiplies the weighted average WA by an arbitrary Gain to thereby obtain an estimated temperature value TE, and then proceeds to S360. Thereafter, the microcomputer 100 executes the processes from S360 through S450 in the same manner as in the first protection process. However, the microcomputer 100 compares the estimated temperature value TE with the alarm determination value TH1 in S360 and compares the estimated temperature value TE with the high-temperature determination value TH2 in S380.

In this second embodiment, since there is no need to store the series of counts of impacts in the first series of data buffers, the second protection process does not include processes that correspond to the processes in S390, S410 and S420 in the first protection process.

In the second embodiment as described in the above, the memory capacity of the microcomputer 100 can be reduced. As a result, a more inexpensive microcomputer can be used as the microcomputer 100, and the cost of the controller 16 can be reduced.

2-5. Third Embodiment

Figure 13:
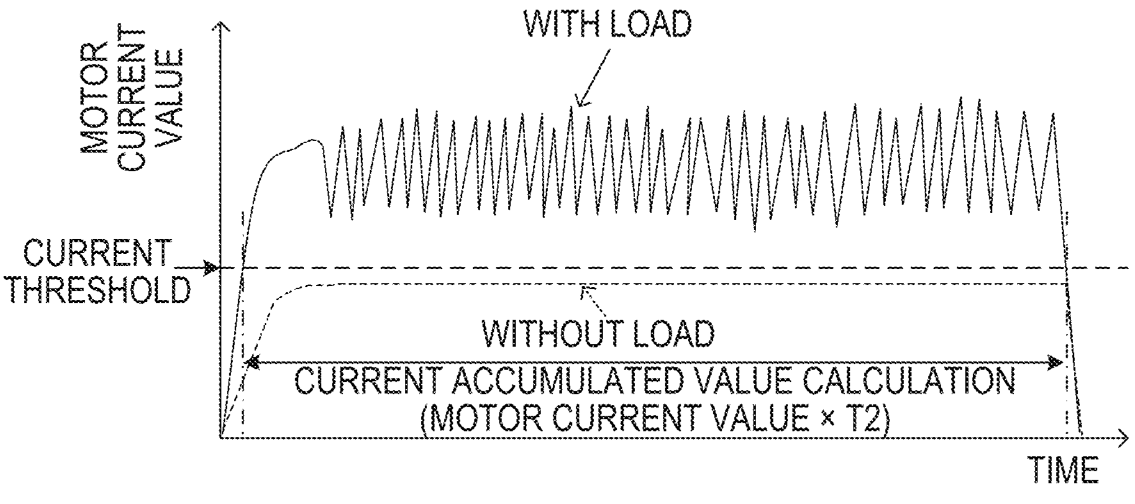
FIG. 13 is an explanatory diagram illustrating an operation in accordance with the third protection process.

As shown in FIG. 13, in the oil pulse tool 1, the motor current increases when an impact is applied to the output shaft 23.

In this third embodiment, the microcomputer 100 calculates the estimated temperature value of the oil unit 22 using the digital value of the magnitude of the motor current (hereinafter referred to as "motor current value"). Specifically the microcomputer 100 executes a third protection process shown in FIG. 12, in place of the first protection process and the second protection process. The third protection process corresponds to the first protection process partially modified. In addition, the microcomputer 100 does not execute the process in S230 in the control process (in other words, the process in S230 is excluded from the control process).

Figure 12:
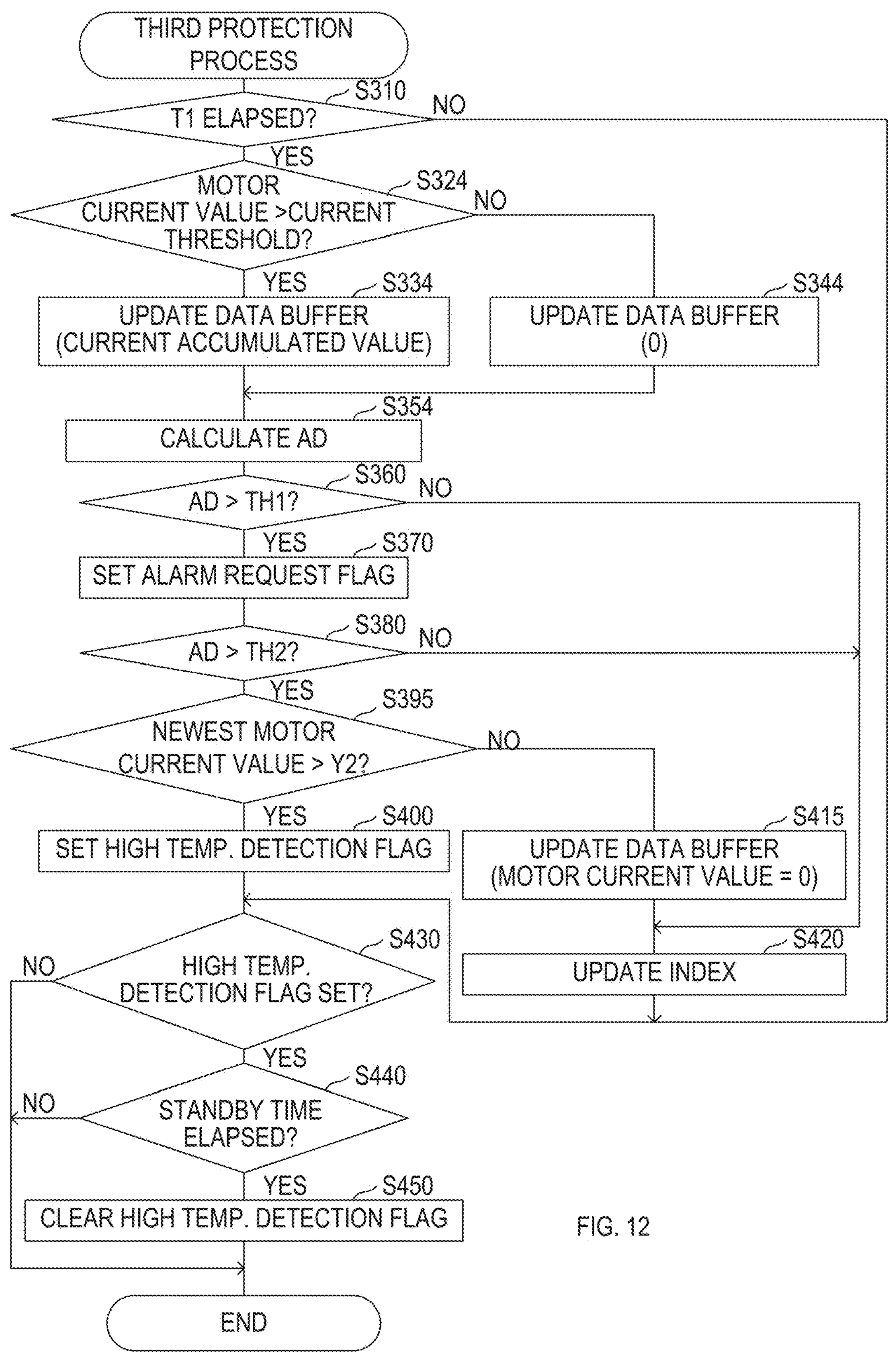
FIG. 12 is a flow chart of a third protection process.

As shown in FIG. 12, in the third protection process, the microcomputer 100 determines, in S310, whether the first preset time period T1 has elapsed since the start of the process in the previous S320, in the same manner as in the first protection process. If the first preset time period T1 has not elapsed (S310: NO), the microcomputer 100 proceeds to S430.

If the first preset time period T1 has elapsed (S310: YES), the microcomputer 100 proceeds to S324. In S324, the microcomputer 100 determines whether the motor current value obtained in the A-to-D conversion process in S220 has exceeded a preset current threshold during the first preset time period T1.

If the motor current value has exceeded the preset current threshold during the first preset time period T1 (S324: YES), the microcomputer 100 proceeds to S334. In S334, the microcomputer 100 calculates, based on (i) the motor current value and (ii) a third time period T3 in which the motor current value has exceeded the current threshold, a current accumulated value (e.g., the current accumulated value=the motor current value×the third time period T3), and stores the calculated current accumulated value in one of the first series of data buffers.

Specifically, the microcomputer 100 extracts, from two or more motor current values stored in the A-to-D conversion process during the first preset time period T1, one or more motor current values that exceed the current threshold, and calculates the current accumulated value based on (i) the extracted one or more motor current values and (ii) their respective sampling intervals.

In another embodiment, the microcomputer 100 may execute a current accumulated value calculation process, in place of the impact count measurement process in S230. In the current accumulated value calculation process, the microcomputer 100 sequentially accumulates two or more motor current values obtained by the A-to-D conversion process.

In S324, if the motor current value has not exceeded the current threshold during the first preset time period T1 (S324: NO), the microcomputer 100 proceeds to S344. In S344, the microcomputer 100 stores the current accumulated value, which is zero, in one of the first series of data buffers, and proceeds to S354. The procedure for storing the current accumulated value in the first series of data buffers is the same as described in the first embodiment. Therefore, a series of current accumulated values obtained within the second preset time period T2 is stored in the first series of data buffers.

In S354, the microcomputer 100 calculates the sum AD of the series of current accumulated values stored in the first series of data buffers as the estimated temperature value of the oil unit 22. Then, the microcomputer 100 executes the processes from S360 to S450 in the same way as in the first protection process. However, the microcomputer 100 executes the processes in S395 and S415 in place of the processes in S390 and S410, respectively.

In S395, the microcomputer 100 determines whether the newest motor current value stored in the first series of data buffers in S334 is greater than a second preset temperature rise determination value Y2.

The second preset temperature rise determination value Y2 is a threshold to determine whether the newest motor current value measured within the most recent first preset time period T1 corresponds to the count of impacts that can cause the actual temperature of the oil unit 22 to rise.

In S415, the microcomputer 100 writes the motor current value, which is zero, in the data buffer in which the motor current value is written in S334.

As described above, in the third embodiment, the microcomputer 100 calculates the current accumulated value every first preset time period T1, and calculates the estimated temperature value of the oil unit 22 by adding the series of current accumulated values calculated during the second preset time period T2. As a result, the third embodiment can protect the oil unit 22 from the high temperature as in the first embodiment.

In the third embodiment, the impact measurement circuit in the overview of embodiments is exemplified as the microcomputer 100 executing the process in S220. The temperature estimation circuit in the overview of embodiments is exemplified as the microcomputer 100 executing the processes in S324 through S354. The lower limit current value in the overview of embodiments is exemplified as the current threshold.

2-6. Further Embodiments

Some embodiments of the present disclosure have been described; however, the present disclosure may be embodied in various forms without limitation to the above-described embodiments.

In one of further embodiments, the first or second variation may be applied to the second or third embodiment.

In one of further embodiments, the impact mechanism may be configured such that the biasing forces of the pair of coil springs 78 alone push the pair of blades 81 in the radially outward direction. Alternatively, the impact mechanism may be configured such that the pair of blades 81 is pushed in the radially outward direction only by the movement of the pair of balls 85 due to the rotation of the cam 66.

In one of further embodiments, a pair of other elastic members may be used in place of the pair of coil springs 78.

In one of further embodiments, the oil pulse tool 1 may include additional output shaft that is arranged orthogonally in front of the output shaft 23.

In one of further embodiments, the oil pulse tool 1 may be configured to operate with AC power delivered by an AC power supply, in place of the DC power delivered by the battery pack 5.

2-7. Supplementary Explanation

Two or more functions of one element in the aforementioned embodiments may be achieved by two or more elements, and one function of one element may be achieved by two or more elements. Furthermore, two or more functions of two or more elements may be achieved by one element, and one function achieved by two or more elements may be achieved by one element. A part of the configurations in the aforementioned embodiments may be omitted. Furthermore, at least a part of the configurations in the aforementioned embodiments may be added to or replaced by another configuration in the above-described embodiments.

What is claimed is:

1. An oil pulse tool comprising:
an output shaft;
an electric motor;
an oil unit configured (i) to contain oil therein, (ii) to be rotated by an output of the electric motor, and (iii) to apply an impact to the output shaft using the oil; and
a controller configured to perform a protection operation to reduce the output of the electric motor, in response to an actual temperature of the oil unit being estimated to exceed or have exceeded a temperature threshold based on an impact characteristic without directly measuring the actual temperature of the oil unit, the temperature threshold being preset.

2. The oil pulse tool according to claim 1,
wherein the controller includes:
a motor drive circuit configured to drive the electric motor;
a motor control circuit configured (i) to receive a command and (ii) to control the electric motor via the motor drive circuit such that the electric motor is driven in accordance with the command;
an impact measurement circuit configured to measure the impact generated in the oil unit;
a temperature estimation circuit configured to calculate an estimated temperature value based on a measurement result obtained by the impact measurement circuit, the estimated temperature value corresponding to an estimated temperature of the oil unit; and
a protection operation circuit configured to perform the protection operation in response to the estimated temperature value having exceeded a first protection threshold, the first protection threshold corresponding to the temperature threshold.

3. The oil pulse tool according to claim 2, wherein:
the impact measurement circuit is configured to measure a series of counts of impacts;
each of the series of counts of impacts corresponds to a total number of impacts applied to the output shaft per specified time; and
the temperature estimation circuit is configured to calculate an accumulated value of the series of counts of impacts measured by the impact measurement circuit as the estimated temperature value.

4. The oil pulse tool according to claim 3, wherein:
the temperature estimation circuit is configured to reduce the accumulated value, in response to any count of impacts among the series of counts of impacts measured by the impact measurement circuit being less than or equal to a lower limit count; and
the lower limit count is preset.

5. The oil pulse tool according to claim 4, wherein:
the temperature estimation circuit includes a first series of data buffers configured to store the series of counts of impacts;
the temperature estimation circuit is configured to sequentially store the series of counts of impacts in the first series of data buffers; and
the estimated temperature value corresponds to a sum of the series of counts of impacts stored in the first series of data buffers.

6. The oil pulse tool according to claim 5,
wherein the protection operation circuit is configured to halt to perform the protection operation in response to (i) the sum of the series of counts of impacts stored in the first series of data buffers having exceeded the first protection threshold and (ii) a newest count of impacts among the series of counts of impacts being less than or equal to the lower limit.

7. The oil pulse tool according to claim 5, wherein:
the temperature estimation circuit includes a second series of data buffers distinct from the first series of data buffers;
a total number of the second series of data buffers is different from a total number of the first series of data buffers;
the temperature estimation circuit is configured (i) to store, in the first series of data buffers, the series of counts of impacts measured while a first load is applied to the output shaft and (ii) to store, in the second series of data buffers, the series of counts of impacts measured while a second load is applied to the output shaft;
the first load is different from the second load;
the protection operation circuit is configured to perform the protection operation in response to (i) the sum of the series of counts of impacts stored in the first series of data buffers having exceeded the first protection threshold or (ii) a sum of the series of counts of impacts stored in the second series of data buffers having exceeded a second protection threshold; and
the second protection threshold is (i) preset and (ii) distinct from the first protection threshold.

8. The oil pulse tool according to claim 2, wherein:
the impact measurement circuit is configured to measure a series of counts of impacts;
each of the series of counts of impacts corresponds to a total number of impacts applied to the output shaft per specified time; and
the temperature estimation circuit is configured to calculate a weighted average of each of the series of counts of impacts as the estimated temperature value.

9. The oil pulse tool according to claim 8,
wherein the temperature estimation circuit is configured to vary a gain for calculating the weighted average depending on whether each of the series of counts of impacts is greater than or equal to a predetermined count of impacts.

10. The oil pulse tool according to claim 2, wherein:
the impact measurement circuit is configured to measure a series of motor current values;
each of the series of motor current values corresponds to a magnitude of a motor current flown through the electric motor per specified time; and
the temperature estimation circuit is configured to calculate an accumulated value of the series of motor current values measured by the impact measurement circuit as the estimated temperature value.

11. The oil pulse tool according to claim 10, wherein:
the temperature estimation circuit is configured to reduce the accumulated value in response to any one of the series of motor current values measured by the impact measurement circuit being less than or equal to a lower limit current value; and
the lower limit current value is preset.

12. The oil pulse tool according to claim 2,
wherein the protection operation circuit is configured to prohibit the motor control circuit from driving the electric motor in the protection operation.

13. The oil pulse tool according to claim 12,
wherein the protection operation circuit is configured to notify a user of the oil pulse tool that the protection operation is being performed, in response to the driving of the electric motor being prohibited.

14. The oil pulse tool according to claim 2, wherein the protection operation circuit is configured to notify a user of the oil pulse tool that the actual temperature of the oil unit has risen in the protection operation.

15. The oil pulse tool according to claim 2, wherein:

the protection operation circuit is configured to disengage the protection operation in response to a standby time having elapsed after an initiation of the protection operation; and the standby time is preset.

16. The oil pulse tool according to claim 2, wherein the protection operation circuit is configured to vary the first protection threshold according to an ambient temperature of the oil pulse tool.

17. The oil pulse tool according to claim 16, wherein the protection operation circuit is configured to vary the first protection threshold according to the ambient temperature at a startup of the oil pulse tool.

18. The oil pulse tool according to claim 2, comprising a microcomputer programmed to operate as the motor control circuit, the impact measurement circuit, the temperature estimation circuit, and/or the protection operation circuit.

19. The oil pulse tool according to claim 2, wherein the oil unit includes:

a case configured (i) to contain the oil therein and (ii) to be rotated by the output of the electric motor, with the output shaft rotatably inserted therethrough; and an impact mechanism configured to apply pressure to the oil so as to apply the impact to the output shaft in response to a predetermined phase difference having occurred between a rotation of the output shaft and a rotation of the case.

20. A method for controlling an oil pulse tool, comprising:

rotating an oil unit of the oil pulse tool by an output of an electric motor;

applying an impact to an output shaft of the oil pulse tool using oil in the oil unit; and performing a protection operation to reduce the output of the electric motor, in response to an actual temperature of the oil unit being estimated to exceed or have exceeded a temperature threshold based on an impact characteristic without directly measuring the actual temperature of the oil unit, the temperature threshold being preset.

* * * * *